United States Patent
Murakami

(10) Patent No.: US 8,300,678 B2
(45) Date of Patent: Oct. 30, 2012

(54) MULTIPATH SIGNAL DETERMINATION METHOD, SIGNAL SUITABILITY DETERMINATION METHOD, POSITIONING OPERATION METHOD, PROGRAM, AND MULTIPATH SIGNAL DETERMINATION CIRCUIT

(75) Inventor: Makoto Murakami, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 848 days.

(21) Appl. No.: 12/326,347

(22) Filed: Dec. 2, 2008

(65) Prior Publication Data

US 2009/0141779 A1 Jun. 4, 2009

(30) Foreign Application Priority Data

Dec. 3, 2007 (JP) ................................. 2007-312341

(51) Int. Cl.
*H04B 1/00* (2006.01)
(52) U.S. Cl. ........ 375/150; 375/147; 375/140; 375/130; 375/142; 375/144; 375/343; 375/148; 375/267; 455/132; 455/136
(58) Field of Classification Search .................. 375/150, 375/147, 140, 130, 142, 144, 148, 343, 267; 455/132, 136
See application file for complete search history.

(56) References Cited

U.S. PATENT DOCUMENTS

| | | | | |
|---|---|---|---|---|
| 5,347,536 | A | * | 9/1994 | Meehan ........................ 375/148 |
| 2003/0165186 | A1 | * | 9/2003 | Kohli et al. .................... 375/150 |
| 2004/0240577 | A1 | * | 12/2004 | Borran et al. ................. 375/267 |

FOREIGN PATENT DOCUMENTS

| | | |
|---|---|---|
| JP | H09-304503 A | 11/1997 |
| JP | 2000-266836 A | 9/2000 |
| JP | 2000-312163 A | 11/2000 |
| JP | 2000-332649 A | 11/2000 |
| JP | 2004-219076 A | 8/2004 |
| JP | 2006-090912 A | 4/2006 |
| WO | WO-2006/044142 A1 | 4/2006 |

* cited by examiner

*Primary Examiner* — Zewdu Kassa

(74) *Attorney, Agent, or Firm* — Global IP Counselors, LLP

(57) ABSTRACT

A multipath signal determination method includes carrying out correlation operation between a received signal of a positioning signal spread-modulated with a spread code and a replica signal of the spread code with respect to each of IQ components at a predetermined sampling phase interval, and determining whether the received signal is a multipath signal or not, in accordance with a plot position in the case where each correlation value in each of the sampling phases is sequentially plotted on an IQ coordinate.

6 Claims, 17 Drawing Sheets

MULTIPATH SIGNAL DETERMINATION METHOD, SIGNAL SUITABILITY DETERMINATION METHOD, POSITIONING OPERATION METHOD, PROGRAM, AND MULTIPATH SIGNAL DETERMINATION CIRCUIT

Japanese Patent Application No. 2007-312341 filed on Dec. 3, 2007, is hereby incorporated by reference in its entirety.

BACKGROUND

1. Technical Field

The present invention relates to a method for determining whether a received signal of a positioning signal that is spread-modulated with a spread code is a multipath signal or not.

2. Related Art

As a positioning system that utilizes a positioning signal, a GPS (Global Positioning System) is widely known and used in a positioning device built in a portable telephone unit, car navigation apparatus or the like. In the GPS, positioning operation is carried out to calculate four parameter values, that is, three-dimensional coordinate values indicating the position of the machine itself and a clock error, on the basis of information such as the positions of plural GPS satellites and a pseudo-distance from each GPS satellite to the machine. Thus, the current position of the machine is measured.

A multipath is a principal element that generates an error in the positioning using the positioning signal. An environment where a multipath is generated is called multipath environment. A multipath environment refers to an environment where an indirect wave such as a reflected wave reflected on a building, ground or the like, a transmitted wave transmitted through an obstacle, or a diffracted wave diffracted from an obstacle is superimposed on a direct wave from a transmission source of the positioning signal (in the case of the GPS, the source is a GPS satellite), and these superimposed waves are received as a multipath signal. The indirect wave causes an error signal that makes it difficult to decode a code.

Various techniques are proposed in order to reduce the influence of this multipath. JP-A-2000-312163 discloses a technique of carrying out correlation operation between a received signal and each of plural replica codes of a C/A code having a different phase for every one chip, finding a phase range where the correlation value is expected to reach a peak, then carrying out correlation operation between the received signal and the plural replica codes having a different phase for every 0.1 chip with respect to the phase range, and thus detecting the code phase.

However, it is generally difficult to determine whether a received signal is a multipath signal or not. Therefore, generally, it is not determined whether a received signal is a multipath signal or not, and even if the signal is a multipath signal, a so-called defensive measure is employed to reduce the influence of the multipath signal on positioning operation. For example, the technique disclosed in JP-A-2000-312163 enables detection of a proper code phase even when a received signal is a multipath signal. Since such a defensive measure is employed, the price for this is paid in various forms such as increase in the quantity of operation and increase in the circuit scale.

SUMMARY

An advantage of some aspects of the invention is to solve the above-mentioned defects.

According to an aspect of the invention, a multipath signal determination method includes carrying out correlation operation between a received signal of a positioning signal spread-modulated with a spread code and a replica signal of the spread code with respect to each of IQ components at a predetermined sampling phase interval, and determining whether the received signal is a multipath signal or not, in accordance with a plot position in the case where each correlation value in each of the sampling phases is sequentially plotted on an IQ coordinate.

According to another aspect of the invention, a multipath signal determination circuit having a processor may be formed. The processor executes correlation operation between a received signal of a positioning signal spread-modulated with a spread code and a replica signal of the spread code with respect to each of IQ components at a predetermined sampling phase interval, and determination of whether the received signal is a multipath signal or not, in accordance with a plot position in the case where each correlation value in each of the sampling phases is sequentially plotted on an IQ coordinate.

As will be described later in detail, an indirect wave has a longer propagation path than the propagation path of a direct wave. Also, the inventor has found that a positional vector on an IQ coordinate of a peak correlation value for only an indirect wave signal is displaced from the positional vector of a peak correlation value for only a direct wave signal. Moreover, the inventor has also found that when each of correlation values in each sampling phase acquired by correlation operation carried out for only a direct wave signal is plotted on the IQ coordinate, the plot positions are linearly arrayed. The inventor has then found that when each of correlation values in each sampling phase acquired by correlation operation carried out for a multipath signal formed by superimposing an indirect wave on a direct wave is sequentially plotted on the IQ coordinate, the plot positions form a certain nonlinear shape instead of being linearly arrayed. According to this aspect of the invention, a multipath signal determination method based on the above principle can be realized and a multipath signal can be determined by a simple method.

More specifically, in the multipath signal determination method, it is preferable that in the determination of whether the received signal is a multipath signal or not, it is determined that the received signal is a multipath signal if the plot position sequentially plotted on the IQ coordinate is changed in the shape of a closed curve.

It is also possible to realize a method of determining suitability, that is, whether the received signal is a signal usable for positioning operation or not, by applying the multipath signal determination method. For example, according to another aspect of the invention, a signal suitability determination method includes, if it is determined by the multipath signal determination method that the received is a multipath signal, determining suitability of the received signal for use in positioning operation in accordance with the extent of the closed curve.

According to still another aspect of the invention, a multipath signal determination method includes carrying out correlation operation between a received signal of a positioning signal spread-modulated with a spread code and a replica signal of the spread code with respect to each of IQ components at a predetermined sampling phase interval, selecting a peak correlation value from the correlation values in each of the sampling phases, and determining whether the received signal is a multipath signal or not, in accordance with a mutual positional relation in the case where the peak correlation value and each correlation value in a lead phase and a lag phase that are away from a peak phase, which is the phase of the peak correlation value, by an equal distance in a leading direction and in a lagging direction, respectively, are plotted on an IQ coordinate.

According to still another aspect of the invention, a multipath signal determination circuit having a processor may be formed. The processor executes correlation operation between a received signal of a positioning signal spread-modulated with a spread code and a replica signal of the spread code with respect to each of IQ components at a predetermined sampling phase interval, selection of a peak correlation value from the correlation values in each of the sampling phases, and determination of whether the received signal is a multipath signal or not, in accordance with a mutual positional relation in the case where the peak correlation value and each correlation value in a lead phase and a lag phase that are away from a peak phase, which is the phase of the peak correlation value, by an equal distance in a leading direction and in a lagging direction, respectively, are plotted on an IQ coordinate.

As will be described later in detail, the inventor has found that when each of correlation values in each sampling phase acquired by correlation operation carried out for only a direct wave signal is plotted on the IQ coordinate, the plot positions are linearly arrayed. The inventor has then found that when each of correlation values in each sampling phase acquired by correlation operation carried out for a multipath signal formed by superimposing an indirect wave on a direct wave is sequentially plotted on the IQ coordinate, the plot positions form a closed curve shape instead of being linearly arrayed. Therefore, in the case of a multipath signal, the multipath signal can be easily determined on the basis of the mutual positional relation in the case where the peak correlation value and each correlation value in a lead phase and a lag phase that are away from a peak phase, which is the phase of the peak correlation value, by an equal distance in a leading direction and in a lagging direction, respectively, are plotted on an IQ coordinate. According to this aspect of the invention, a multipath signal determination method based on the above principle can be realized.

More specifically, it is preferable that in the determination of whether the received signal is a multipath signal or not, it is determined that the received signal is a multipath signal if a positional vector formed by plotting the correlation value in the lead phase and a positional vector formed by plotting the correlation value in the lag phase are displaced in opposite directions to each other with respect to a positional vector formed by plotting the peak correlation value.

It is also possible to realize a method of determining suitability, that is, whether the received signal is a signal usable for positioning operation or not, by applying the multipath signal determination method according to the above aspect of the invention. For example, according to still another aspect of the invention, a signal suitability determination method includes, if it is determined by the multipath signal determination method that the received signal is a multipath signal, determining suitability of the received signal for use in positioning operation in accordance with an angle formed by a positional vector formed by plotting the correlation value in the lead phase and a positional vector formed by plotting the correlation value in the lag phase.

According to still another aspect of the invention, a signal suitability determination method includes, if it is determined by the multipath signal determination method that the received signal is a multipath signal, determining that the received signal is unsuitable for use in positioning operation in the case where one or both of the following conditions are met, that is, (1) an angle formed by a positional vector formed by plotting the correlation value of the peak correlation value and a positional vector formed by plotting the correlation value in the lead phase is a predetermined angle or greater, and (2) an angle formed by a positional vector formed by plotting the peak correlation value and a positional vector formed by plotting the correlation value in the lag phase is a predetermined angle or greater.

According to still another aspect of the invention, a multipath signal determination method includes carrying out correlation operation processing plural times with the lapse of time, in which correlation operation is carried out between a received signal of a positioning signal spread-modulated with a spread code and a replica signal of the spread code with respect to each of IQ components at a predetermined sampling phase interval, carrying out selection of a peak correlation value from the correlation values in each of the sampling phases for each of the plural times of correlation operation processing, and determining whether the received signal is a multipath signal or not, in accordance with a positional change in the peak correlation value on an IQ coordinate with the lapse of time.

According to still another aspect of the invention, a multipath signal determination circuit having a processor may be formed. The processor executes plural times of correlation operation processing with the lapse of time, in which correlation operation is carried out between a received signal of a positioning signal spread-modulated with a spread code and a replica signal of the spread code with respect to each of IQ components at a predetermined sampling phase interval, selection of a peak correlation value from the correlation values in each of the sampling phases for each of the plural times of correlation operation processing, and determination of whether the received signal is a multipath signal or not, in accordance with a positional change in the peak correlation value on an IQ coordinate with the lapse of time.

As will be described later in detail, an indirect wave has a longer propagation path than the propagation path of a direct wave. Also, the inventor has found that a positional vector on an IQ coordinate of a peak correlation value for only an indirect wave signal is displaced from the positional vector of a peak correlation value for only a direct wave signal. Moreover, the inventor has also found that when each of correlation values in each sampling phase acquired by correlation operation carried out for a multipath signal formed by superimposing an indirect wave on a direct wave is sequentially plotted on the IQ coordinate, the plot positions form a certain nonlinear shape. Moreover, by verifying change in time series on the basis of results of the plural times of correlation operation processing instead of single correlation operation processing, the inventor has found that the peak correlation value of a multipath signal changes in position on the IQ coordinate. According to this aspect of the invention, a multipath signal determination method based on the above principle can be realized.

More specifically, it is preferable that in the determination of whether the received signal is a multipath signal or not, it is determined that the received signal is a multipath signal when the change in position of the peak correlation value on the IQ coordinate with the lapse of time is an arcuate change in position.

It is also possible to realize a method of determining suitability, that is, whether the received signal is a signal usable for positioning operation, by applying the multipath signal determination method according to the above aspect of the invention. According to still another aspect of the invention, a signal suitability determination method includes, if it is determined by the multipath signal determination method that the received signal is a multipath signal, determining that the received signal is unsuitable for use in positioning operation.

According to still another aspect of the invention, a positioning operation method includes carrying out positioning operation based on a remaining positioning signal after excluding a positioning signal that is determined as unsuitable by the signal suitability determination method, of plural received positioning signals.

According to still another aspect of the invention, a program for causing a computer built in a positioning device to execute the positioning operation method may be configured.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, a preferred exemplary embodiment of the invention will be described. In the following description, a portable telephone unit is employed as an electronic apparatus having a positioning device, and the GPS is used as a positioning system. However, the embodiment to which the invention can be applied is not limited to this.

1. PRINCIPLE

First, a method of determining a multipath signal will be described, which is one of the most characteristic processes of this embodiment.

1-1. Method of Detecting Closed-Curve Change in Correlation Value

A portable telephone unit 1 carries out correlation operation between a GPS satellite signal transmitted from a GPS satellite and a replica signal imitating a GPS satellite signal to be captured, which is simulatively generated within the portable telephone unit 1, while changing the frequency and phase of the replica signal. More specifically, the C/A (Coarse and Acquisition) code of a GPS satellite signal transmitted from a GPS satellite is prescribed in advance for each GPS satellite. Therefore, correlation operation is carried out between the C/A code of the received GPS satellite signal and the replica code simulating the C/A code of the GPS satellite signal to be captured.

In this case, the correlation operation is carried out while the frequency and phase of the replica code (replica signal) are changed. If the frequency of the replica signal coincides with the frequency of the received signal, and the GPS satellite signal and the replica signal coincide with each other in phase at the time of correlation operation, the correlation value obtained by the correlation operation reaches a maximum.

In the following, the case of carrying out correlation operation between a replica signal and a received signal while changing the phase of the replica signal where the frequency of the replica signal coincides with the frequency of the received signal will be described. The interval of changing the frequency and phase in carrying out correlation operation is referred to as "sampling interval" Each of sampled phases is referred to as "sampling phase".

Figure 1:
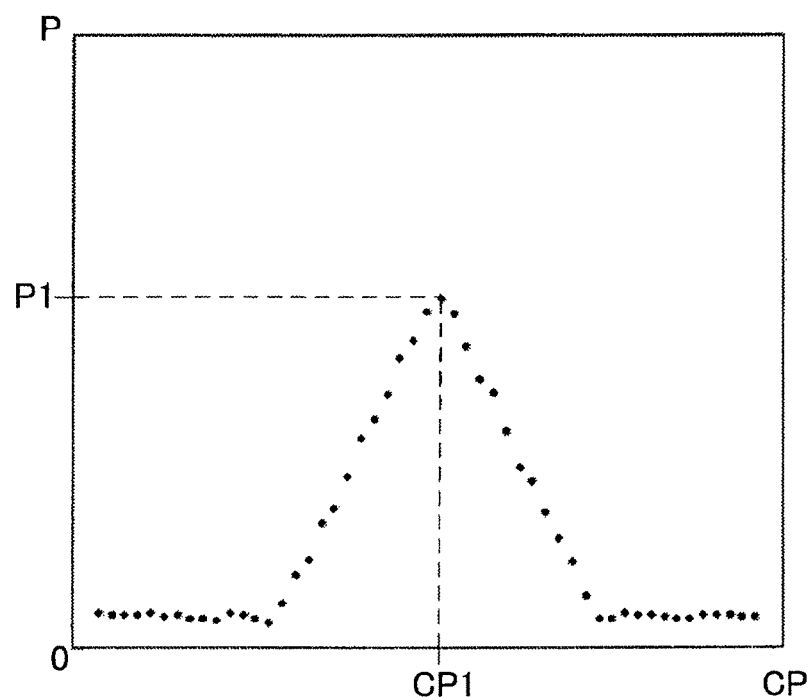
FIG. 1 is a view showing an exemplary result of correlation with a direct wave signal.
Figure 2:
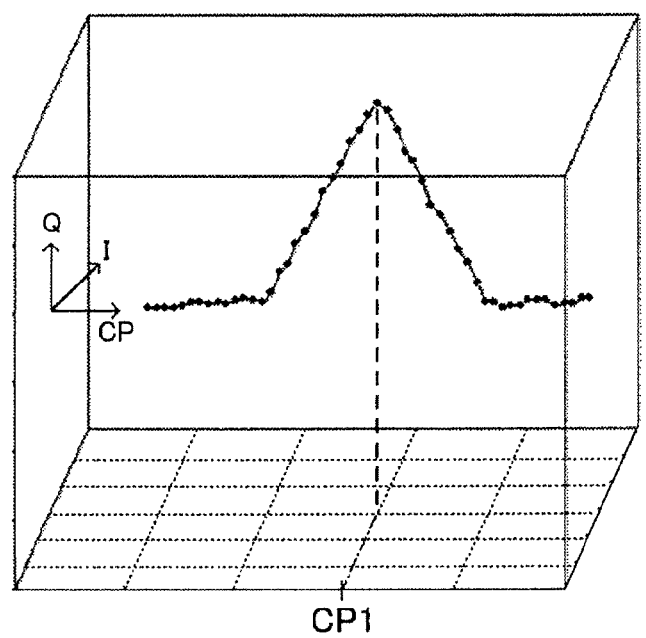
FIG. 2 is a view showing an exemplary result of correlation with a direct wave signal.
Figure 3:
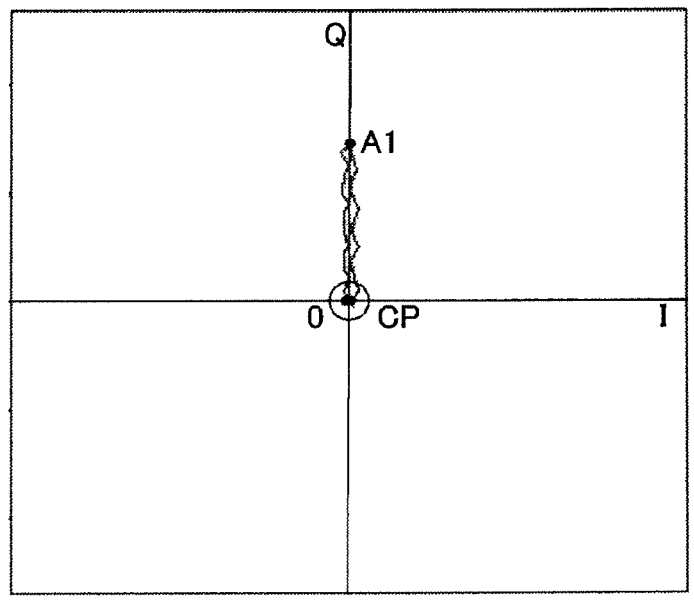
FIG. 3 is a view showing an exemplary result of correlation with a direct wave signal.

FIG. 1 to FIG. 3 are views showing an exemplary result of correlation between a direct wave signal that is formed exclusively by a direct wave signal from a GPS satellite, and a replica signal. FIG. 1 is a view plotting the correlation value in each sampling phase, in which the horizontal axis represents code phase "CP" and the vertical axis represents correlation value "P". As can be seen from FIG. 1, in a sampling phase "CP1", a peak correlation value "P1" is reached, which is the maximum correlation value. It can also be seen that change in correlation value is expressed in a substantially triangular shape with the peak correlation value "P1" serving as a vertex.

FIG. 2 is a graph in which the direct wave signal is separated into IQ components and correlation values obtained by correlation operation between the replica signal and each of the IQ signals are three-dimensionally plotted on a coordinate with its three axes representing code phase "CP", I component "I" of the correlation value, and Q component "Q" of the correlation value. FIG. 3 is a view showing the graph of FIG. 2 as viewed from the positive direction on the code phase axis "CP". As can be seen from these graphs, the correlation values substantially overlap the Q axis on the IQ coordinate and form a substantially linear locus. The farthest point "A1" from the origin "O" is the point corresponding to the peak correlation value "P1" in FIG. 1.

Since a comprehensible graph is employed as an example in this case, correlation values are distributed on the Q axis. That is, the IQ coordinate axes can be arranged arbitrarily. Therefore, depending on the arrangement of the IQ coordinate axes, correlation values may not be distributed on the Q axis. However, even in such cases, there is no doubt that the distribution of correlation values is substantially linear from the original in FIG. 3 as one end.

Figure 4:
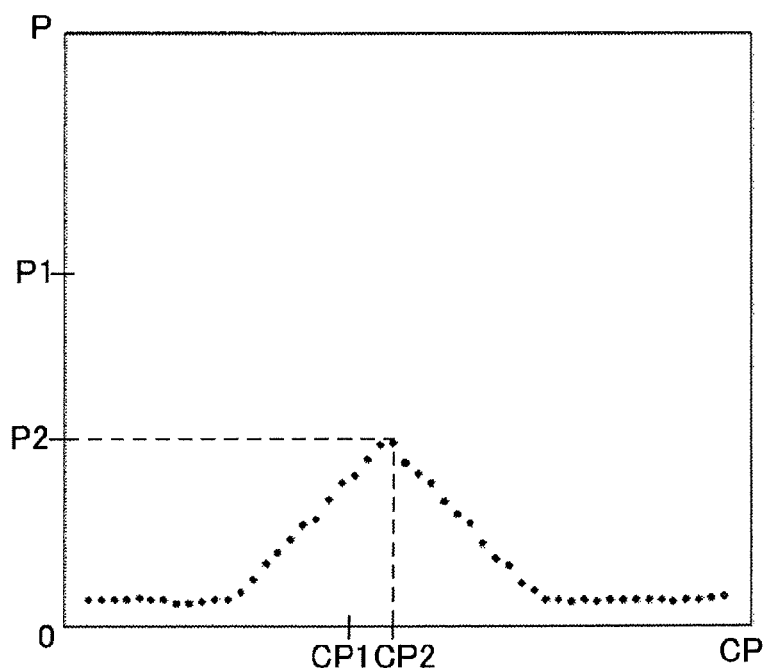
FIG. 4 is a view showing an exemplary result of correlation with an indirect wave signal.
Figure 5:
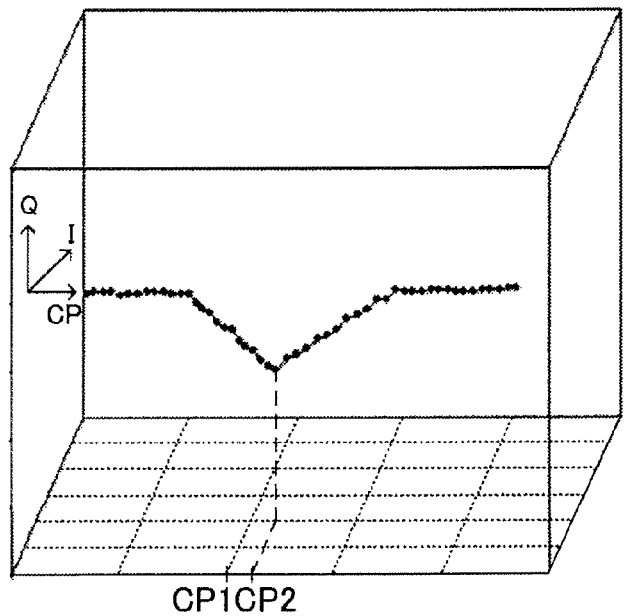
FIG. 5 is a view showing an exemplary result of correlation with an indirect wave signal.
Figure 6:
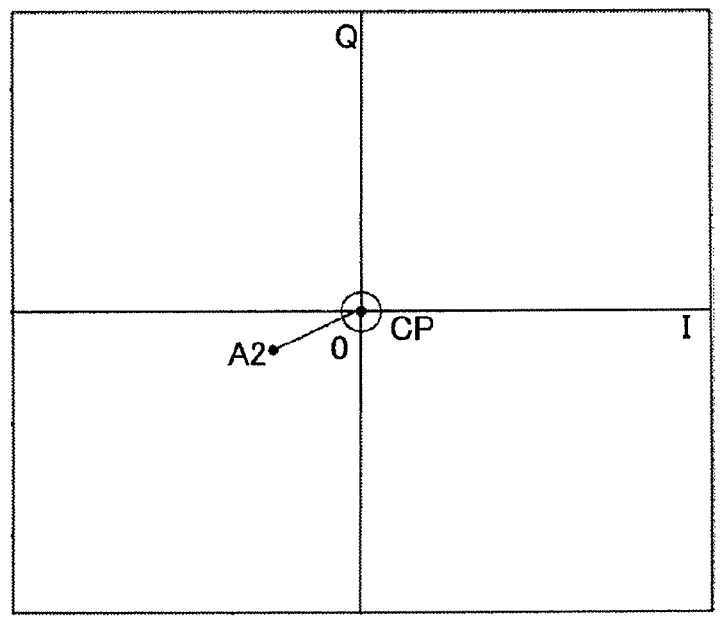
FIG. 6 is a view showing an exemplary result of correlation with an indirect wave signal.

FIG. 4 to FIG. 6 are views showing an exemplary result of correlation between an indirect wave signal that is formed exclusively by an indirect wave signal, and a replica signal. FIG. 4 to FIG. 6 show change in correlation value in the same coordinate systems as FIG. 1 to FIG. 3, respectively. As can be seen from FIG. 4, a peak correlation value "P2" is reached in a sampling phase "CP2". The peak correlation value "P2" is smaller than the peak correlation value "P1" of FIG. 1 (P1>P2). This is because the signal transmitted from the GPS satellite is reflected by a building, ground or the like or transmitted through an obstacle and thus has its signal intensity lowered, thereby reducing the correlation value obtained by correlation operation, as a whole.

It can also be seen that the sampling phase "CP2" lags behind the sampling phase "CP1" of FIG. 1 (CP1<CP2). This is because the signal transmitted from the GPS satellite is reflected by a building, ground or the like or diffracted by an obstacle, thereby causing its propagation path length of the signal from the GPS satellite to the portable telephone unit 1 to be longer.

FIG. 5 is a graph that three-dimensionally plots correlation values of the indirect wave signal. FIG. 6 is a view showing the graph of FIG. 5 as viewed from the positive direction on the code phase axis "CP". In FIG. 5 and FIG. 6, the coordinate system is formed with the coordinate axes in the same direction as in FIG. 2. As can be seen from these drawings, in the third quadrant of the IQ coordinate, the locus of correlation value forms a substantially linear locus that is slightly inclined with respect to I axis. The farthest point "A2" from the origin "O" is the point corresponding to the peak correlation value "P2" in FIG. 4.

Figure 7:
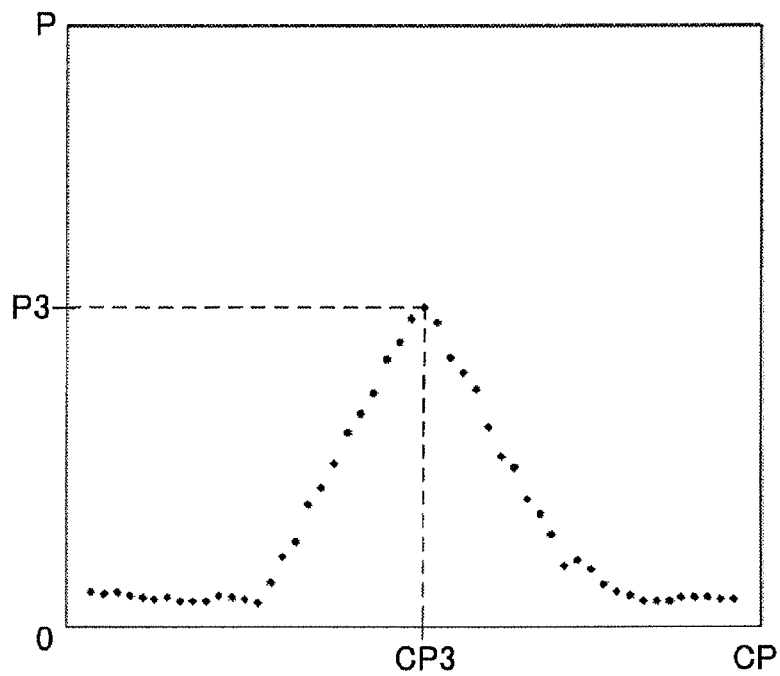
FIG. 7 is a view showing an exemplary result of correlation with a multipath signal.
Figure 8:
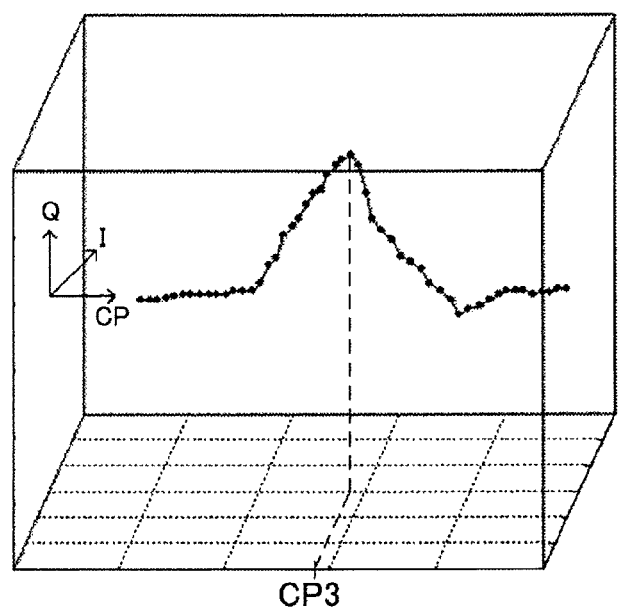
FIG. 8 is a view showing an exemplary result of correlation with a multipath signal.
Figure 9:
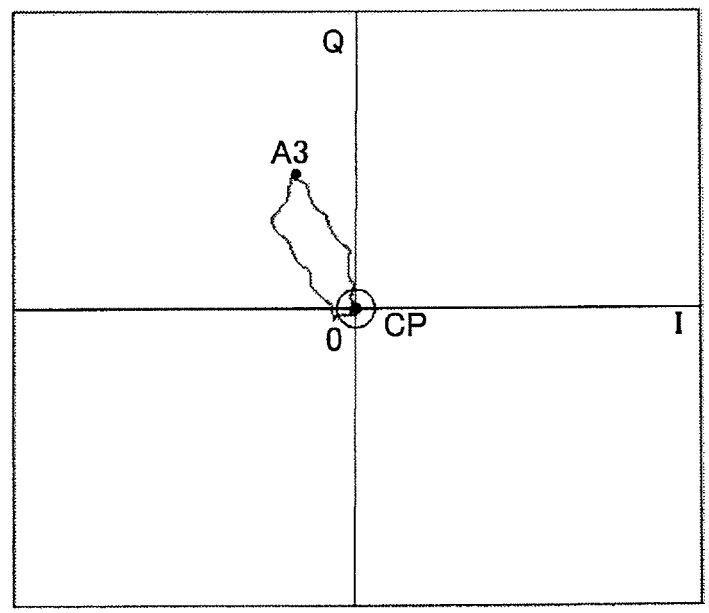
FIG. 9 is a view showing an exemplary result of correlation with a multipath signal.

FIG. 7 to FIG. 9 are views showing an exemplary result of correlation between a multipath signal formed by superimposing the direct wave signal and indirect wave signal, and a replica signal. FIG. 7 to FIG. 9 show change in correlation value in the same coordinate systems as in FIG. 1 to FIG. 3, respectively. As can be seen from FIG. 7 and FIG. 8, the triangular shape is distorted by the superimposition of the direct wave signal on the indirect wave signal.

As can be seen from FIG. 9, the correlation values plotted on the IQ coordinate form a closed-curve locus. That is, if it is sufficiently (for example, by one chip) away from the peak phase, the correlation value in each sampling phase from the negative direction to the position direction on the CP axis (for example, from one chip before the peak phase to one chip after that) is plotted at the origin in FIG. 9 since its I value and Q value are zero.

On the other hand, in sampling phases close to the peak phase, I value and Q value are not zero and correlation values are plotted at positions away from the origin. In the example of FIG. 9, the plot positions are expressed as being arrayed in a closed curve in the second quadrant of the IQ coordinate. The farthest point "A3" from the origin "O" is the point corresponding to the peak correlation value "P3" in FIG. 7.

Although the locus of correlation value (array of plot positions) is not necessarily a complete closed curve, it can be said that the locus forms a substantially closed curve. Therefore, in consideration of all these cases, hereinafter, the correlation value will be described as being changed "in the shape of a closed curve".

The closed-curve change (locus) in correlation value on the IQ coordinate is greatly different from the case where only the direct wave signal is used which forms a substantially linear locus on the IQ coordinate or from the case where only the indirect wave is used. Therefore, by a simple technique such as determining whether the correlation value plotted on the IQ coordinate changes in the shape of a closed curve or not, it is possible to determine whether the received signal is a multipath signal or not.

1-2. Method of Detecting Displacement of Correlation Values Before and After Peak Correlation Value Next, a method of determining a multipath signal will be described which uses a peak correlation value, a correlation value in a sampling phase (hereinafter referred to as "lead phase") that is advanced by a predetermined distance (by a predetermined phase width in the phase direction) from the peak phase, which is the phase of the peak correlation value, and a correlation value in a sampling phase (hereinafter referred to as "lag phase") lagging behind the peak phase by a predetermined distance.

Figure 10:
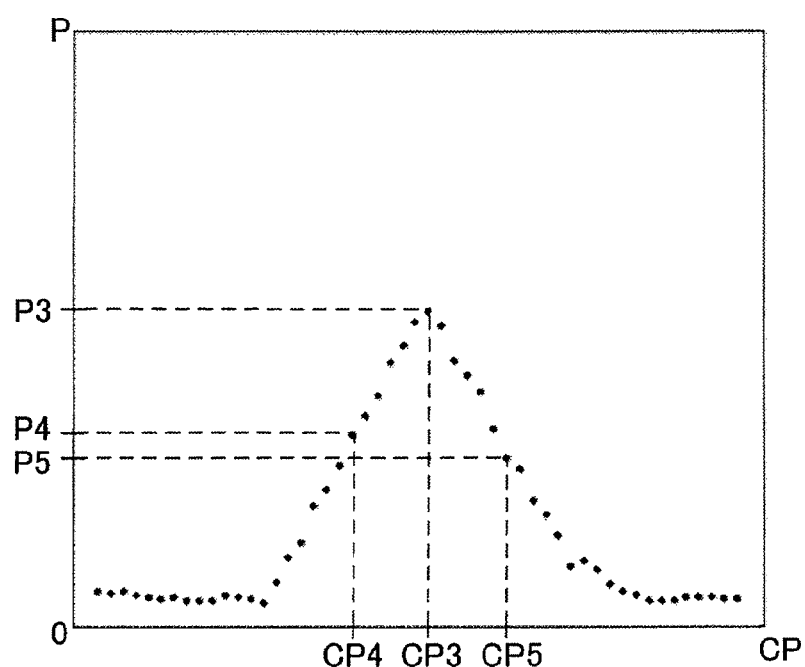
FIG. 10 is a view showing an exemplary result of correlation with a multipath signal.

FIG. 10 shows exemplary correlation values "P" with a multipath signal, as in FIG. 7. A sampling phase advanced by ½ chips from a peak phase "CP3", which is the sampling phase of a peak correlation value "P3", is a lead phase "CP4". A sampling phase lagging behind the peak phase by ½ chips is a lag phase "CP5". The correlation value in the lead phase "CP4" is a lead correlation value "P4". The correlation value in the lag phase "CP5" is a lag correlation value "P5".

Figure 11:
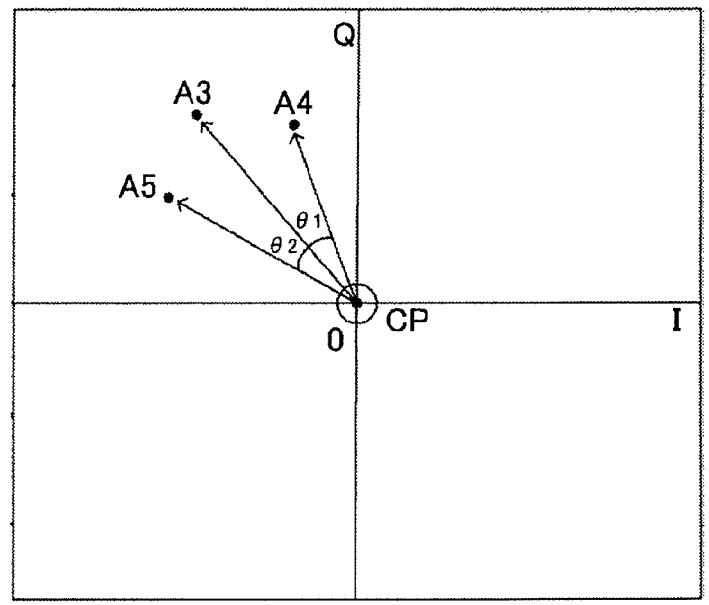
FIG. 11 is an explanatory view of the principle of multipath signal determination.

In this case, the three correlation values can be plotted on the IQ coordinate as shown in FIG. 11. In FIG. 11, points "A3", "A4" and "A5" represent the peak correlation value "P3", the lead correlation value "P4" and the lag correlation value "P5", respectively. The positional vectors from the origin "O" toward the points "A3", "A4" and "A5" are referred to as "peak correlation vector", "lead correlation vector" and "lag correlation vector", respectively.

As can be seen from FIG. 11, the lead correlation vector and the lag correlation vector are displaced in opposite directions from the peak correlation vector. Specifically, the lead correlation vector is displaced clockwise from the peak correlation vector and its displacement angle is "θ1". The lag correlation vector is displaced counterclockwise from the peak correlation vector and its displacement angle is "θ2".

Therefore, by a simple technique such as detecting that the lead correlation vector and the lag correlation vector are displaced in opposite directions from the peak correlation vector on the IQ coordinate, it is possible to determine whether the received signal is a multipath signal or not. For example, the following techniques can be considered. The sum of the absolute values of the displacement angles "θ1" and "θ2" is calculated, and if the calculated sum is equal to or greater than a predetermined threshold angle (for example, 15 degrees), it is determined that the received signal is a multipath signal. Alternatively, if one or both of the absolute values of the displacement angles "θ1" and "θ2" is equal to or greater than a predetermined threshold angle (for example, 7.5 degrees), it is determined that the received signal is a multipath signal.

1-3. Method of Detecting Arcuate Positional Change in Peak Correlation Value with Time The above method of determining a multipath signal focuses on change in correlation value at a certain time point. However, it is also possible to determine a multipath signal by focusing on change in peak correlation value with time.

Figure 12:
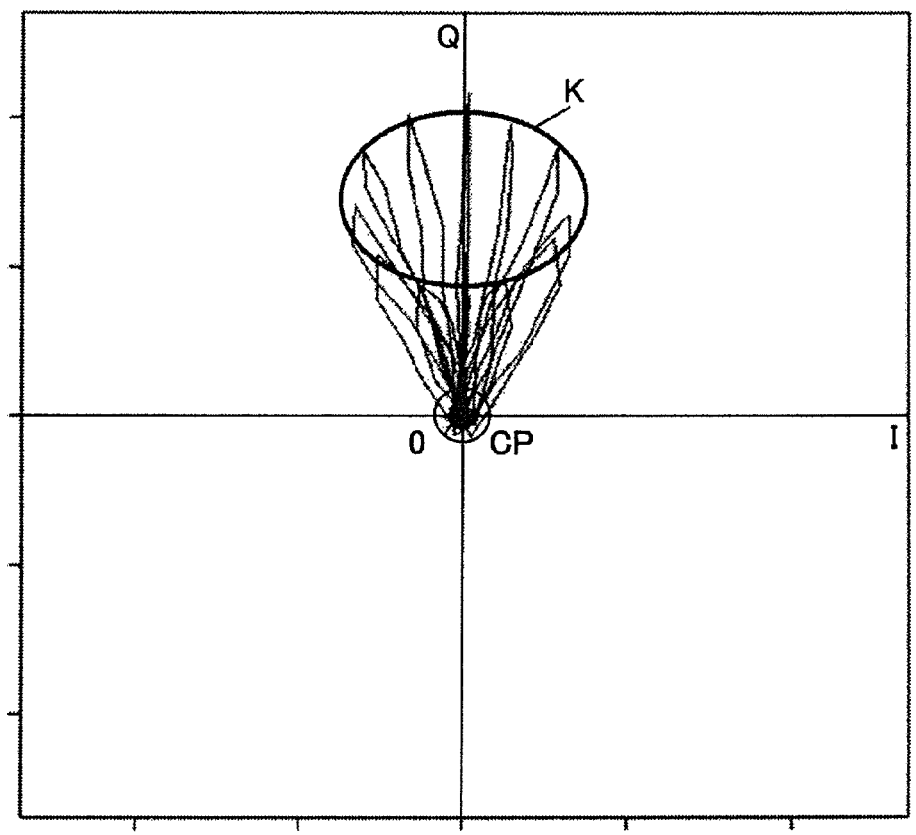
FIG. 12 is an explanatory view of the principle of multipath signal determination.

FIG. 12 is a view plotting on the IQ coordinate the correlation value at each time point in the case where correlation operation with a multipath signal is carried out at plural consecutive time points while the portable telephone unit 1 is moving. As the portable telephone unit 1 moves, the signal propagation path length from the GPS satellite to the portable telephone unit 1 and the signal intensity change. Therefore, though the correlation value at each time point still changes in a closed curve shape on the IQ coordinate, the magnitude of the peak correlation value and the sampling phase in which the peak correlation value is taken change and therefore the direction and size of the closed curve change.

Consequently, it is found that, when connected to each other, the farthest points from the origin "O", that is, the points corresponding to the peak correlation value of the correlation values plotted on the IQ coordinate at their respective time points, an arcuate locus is formed. FIG. 12 shows an exemplary case where the locus connecting the points corresponding to the peak correlation value forms a circular locus "K", as the most ideal state.

Thus, by plotting the result of correlation operation at each time point on the IQ coordinate, then connecting the points corresponding to the peak correlation value, and detecting that there is an arcuate positional change in peak correlation value, it is possible to determine whether the received signal is a multipath signal or not.

2. EMBODIMENTS

2-1. First Embodiment

Figure 13:
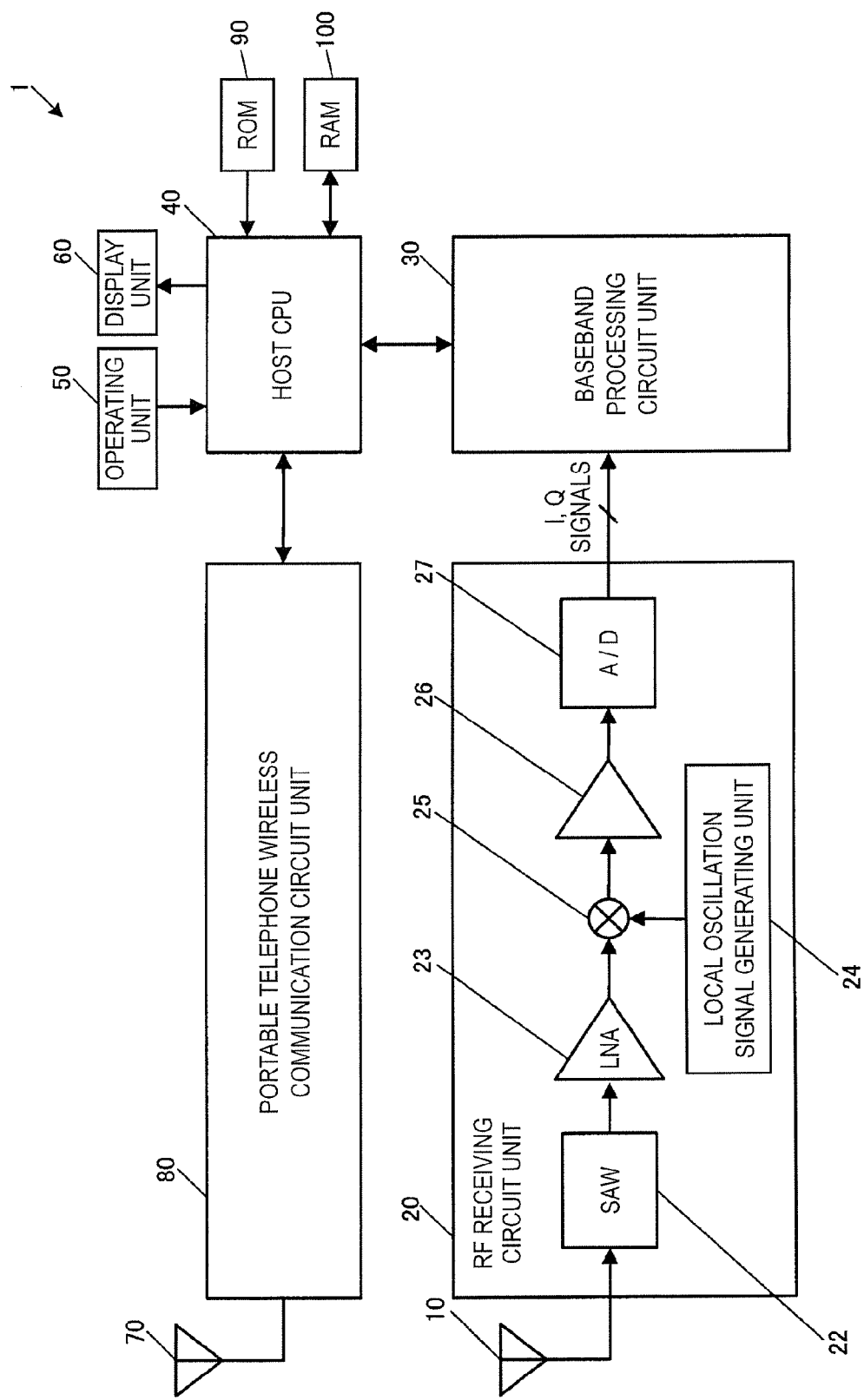
FIG. 13 is a block diagram showing the functional configuration of a portable telephone unit.

FIG. 13 is a block diagram showing the functional configuration of the portable telephone unit 1. The portable telephone unit 1 includes a GPS antenna 10, an RF receiving circuit unit 20, a baseband processing circuit unit 30, a host CPU (Central Processing Unit) 40, an operating unit 50, a display unit 60, a portable telephone antenna 70, a portable telephone wireless communication circuit unit 80, a ROM (Read Only Memory) 90, and a RAM (Random Access Memory) 100.

The GPS antenna 10 is an antenna that receives RF (Radio Frequency) signals including GPS satellite signals transmitted from GPS satellites. The GPS antenna 10 outputs the received signals to the RF receiving circuit unit 20. A GPS satellite signal is a spread spectrum modulated signal called C/A code and is superimposed on a L1-band carrier having the carrier frequency of 1.57542 [GHz].

The RF receiving circuit unit 20 is a circuit block that processes high-frequency signals (RF signals). Schematically, the RF receiving circuit unit 20 includes a SAW (Surface Acoustic Wave) filter 22, an LNA (Low Noise Amplifier) 23, a local oscillation signal generating unit 24, a multiplier unit 25, an amplifier unit 26, and an A/D (Analog-Digital) converter unit 27.

The RF receiving circuit unit 20 is a receiving system that has the SAW filter 22 as a band-pass filter at its input stage and receives signals by using a so-called superheterodyne system. In this embodiment, a received signal is separated into signals of inphase component (I component) and quadrature component (Q component) (that is, I signal and Q signal), which are then processed. The method of separating IQ signals is known and therefore will not be described further in detail. In the RF receiving circuit unit 20 of FIG. 13, these signals are collectively shown.

The SAW filter 22 is a band-pass filter that passes a component in a predetermined frequency band, from the signal received by the GPS antenna 10. The SAW filter 22 outputs the passed signal to the LNA 23.

The LNA 23 is a low noise amplifier that amplifies the signal passed through the SAW filter 22, and outputs the amplified signal to the multiplier unit 25.

The local oscillation signal generating unit 24 is a circuit unit that generates a local oscillation signal for RF signal multiplication, including an oscillator such as an LO (Local Oscillator). The local oscillation signal generating unit 24 outputs the generated local oscillation signal to the multiplier unit 25.

The multiplier unit 25 has a multiplier that multiplies a signal amplified by the LNA 23 by the local oscillation signal generated by the local oscillation signal generating unit 24. The multiplier unit 25 down-converts the RF signal to an intermediate-frequency signal (hereinafter referred to as "IF (Intermediate Frequency) signal") and then outputs the signal to the amplifier unit 26. Although not shown in detail, the multiplier unit 25 multiplies each of local oscillation signals with their phase shifted by 90 degrees from each other, by the received signal. Thus, the multiplier unit 25 down-converts the received signal to an IF signal and separates the received signal into I signal and Q signal.

The amplifier unit 26 has an amplifier that amplifies the IF signal outputted from the multiplier unit 25, with a predetermined amplification factor. The amplifier unit 26 outputs the amplified signal to the A/D converter unit 27.

The A/D converter unit 27 has an A/D converter that converts an analog signal to a digital signal. The A/D converter unit 27 converts the signal amplified by the amplifier unit 26 to a digital signal and then outputs the digital signal to the baseband processing circuit unit 30. Thus, the I signal and Q signal of the IF signal are outputted from the RF receiving circuit unit 20.

The baseband processing circuit unit 30 is a positioning circuit that carries out correlation processing or the like to the IF signal outputted from the RF receiving circuit unit 20 to capture and extract a GPS satellite signal, then decodes its data, extracts a navigation message, time information or the like, and carries out positioning operation. In this embodiment, the baseband processing circuit unit 30 also functions as a multipath signal determination circuit that determines whether the received signal is a multipath signal or not, and as a signal suitability determination circuit that determines whether the received signal is suitable for use in positioning operation or not.

Figure 14:
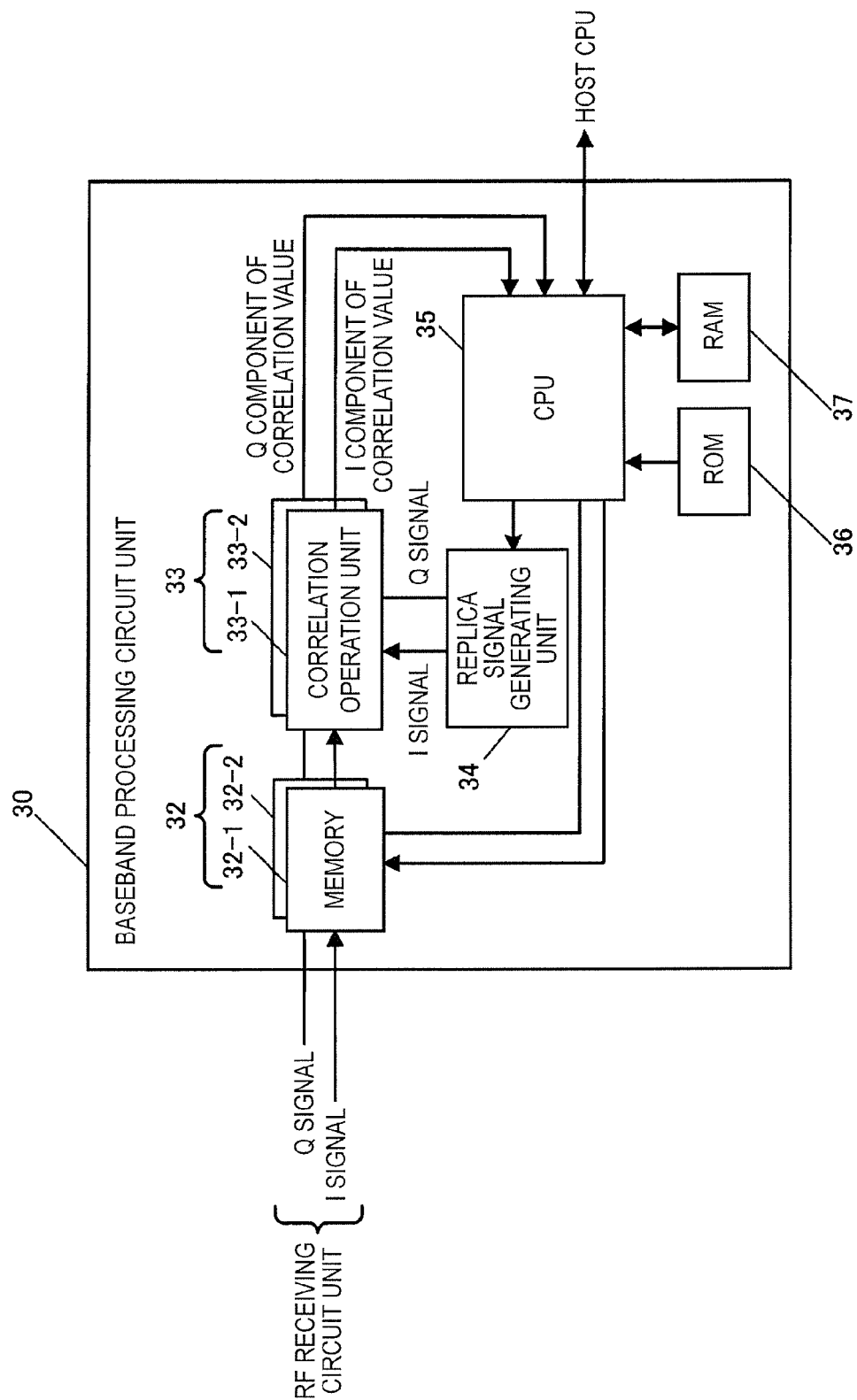
FIG. 14 is a view showing an exemplary circuit configuration of a baseband processing circuit unit.

FIG. 14 is a view showing an exemplary circuit configuration of the baseband processing circuit unit 30. The baseband processing circuit unit 30 has a memory 32 (32-1, 32-2) a correlation operation unit 33 (33-1, 33-2), a replica signal generating unit 34, a CPU 35, a ROM 36, and a RAM 37.

The memory 32 samples the IF signal inputted from the RF receiving circuit unit 20 at predetermined time intervals in accordance with a control signal from the CPU 35 and thus stores the sampled signal. The memory 32 includes a first memory 32-1 that stores sampling data of the I signal and a second memory 32-2 that stores sampling data of the Q signal.

The correlation operation unit 33 carries out correlation operation between the sampling data of the IF signal stored in the memory 32 and a replica signal inputted from the replica signal generating unit 34, and outputs the result of correlation to the CPU 35. In this case, the correlation operation unit 33 carries out correlation operation while shifting the phase of the replica signal, and thus calculates the correlation value in each sampling phase. The correlation operation unit 33 includes a first correlation operation unit 33-1 that carries out correlation operation with respect to the I signal and a second correlation operation unit 33-2 that carries out correlation operation with respect to the Q signal. These correlation operation units output the I component and Q component of the correlation value, respectively, to the CPU 35.

The replica signal generating unit 34 generates a replica signal imitating a GPS satellite signal from a GPS satellite as a capture target (hereinafter referred to as "capture target satellite") in accordance with a control signal from the CPU 35 and outputs the generated replica signal to the correlation operation unit 33. The replica signal generating unit 34 outputs the I component of the generated replica signal to the first correlation operation unit 33-1 and outputs the Q component of the replica signal to the second correlation operation unit 33-2.

The CPU 35 is a processor that carries out positioning operation and thus measures the current position of the portable telephone unit 1. Specifically, the CPU 35 detects the C/A code and code phase included in the GPS satellite signal in accordance with the result of correlation outputted from the correlation operation unit 33 and thus captures and follows the GPS satellite signal. Then, the CPU 35 decodes the data of the GPS satellite signal that is captured and followed, thus takes out a navigation message, and carries out calculation of a pseudo distance, positioning operation and so on in accordance with orbit information, time information and the like of the GPS satellite included in the navigation message. Thus, the current position of the portable telephone unit 1 is measured.

In this embodiment, the CPU 35 executes the positioning operation for the current position. However, a part or all of the processing executed by the CPU 35 may also be executed by the host CPU 40.

Figure 15:
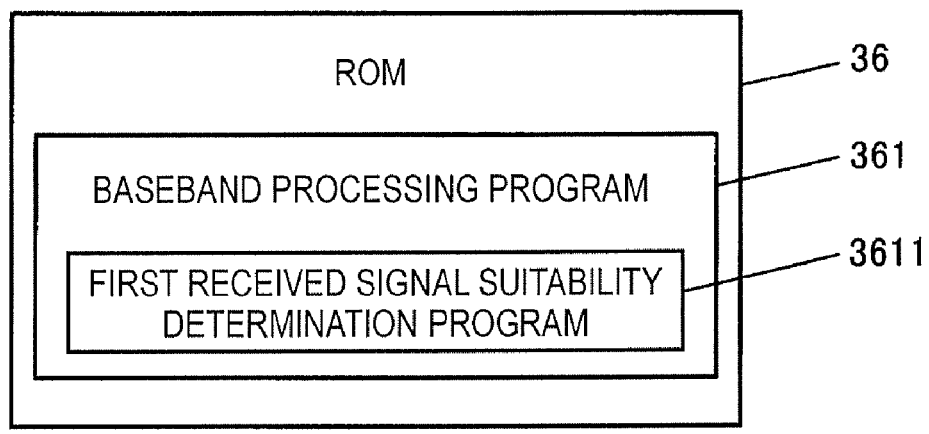
FIG. 15 is a view showing exemplary data stored in a ROM.

FIG. 15 is a view showing exemplary data stored in the ROM 36. In the ROM 36, a baseband processing program 361 is stored which is read out by the CPU 35 and executed as baseband processing (see FIG. 18). The baseband processing program 361 includes, as a subroutine, a first received signal suitability determination program 3611 to be executed as first received signal suitability determination processing (see FIG. 19).

In the first received signal suitability determination processing, the CPU 35 determines whether a received signal from each of capture target satellites is a signal suitable for positioning (hereinafter referred to as "positioning-suitable signal") or a signal unsuitable for positioning (hereinafter referred to as "positioning-unsuitable signal"). If it is determined by the first received signal suitability determination processing that the received signal is a positioning-suitable signal, measurement information for positioning operation is decided in accordance with the result of correlation with respect to the received signal. Then, positioning operation is carried out on the basis of the measurement information and the current position of the portable telephone unit 1 is measured.

Here, the measurement information is information about the received signal used by the CPU 35 in positioning operation and includes, for example, information of the receiving frequency and code phase of the received signal. The information of the receiving frequency is mainly used to calculate the speed and direction of movement of the portable telephone unit 1. The information of the code phase is mainly used to calculate the position of the portable telephone unit 1. For positioning operation, for example, positioning operation using a least square method or positioning operation using a Kalman filter can be employed.

In the first received signal suitability determination processing, the CPU 35 plots on the IQ coordinate the correlation value in each sampling phase outputted from the correlation operation unit 33, and determines that the received signal is a multipath signal when it is detected that the plotted correlation value changes in a closed-curve shape. If the area of the zone surrounded by the closed curve exceeds a predetermined threshold value, the CPU 35 determines that the received signal is a positioning-unsuitable signal. The first received signal suitability determination processing the baseband processing will be described in detail later with reference to flowcharts.

Figure 16:
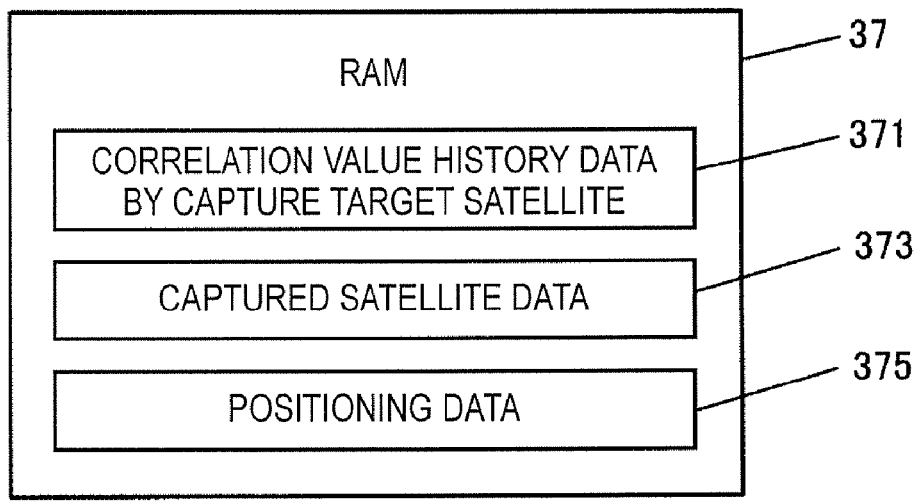
FIG. 16 is a view showing exemplary data stored in a RAM.

FIG. 16 is a view showing exemplary data stored in the RAM 37. Correlation value history data by capture target satellite 371, captured satellite data 373, and positioning data 375 are stored in the RAM 37.

Figure 17:
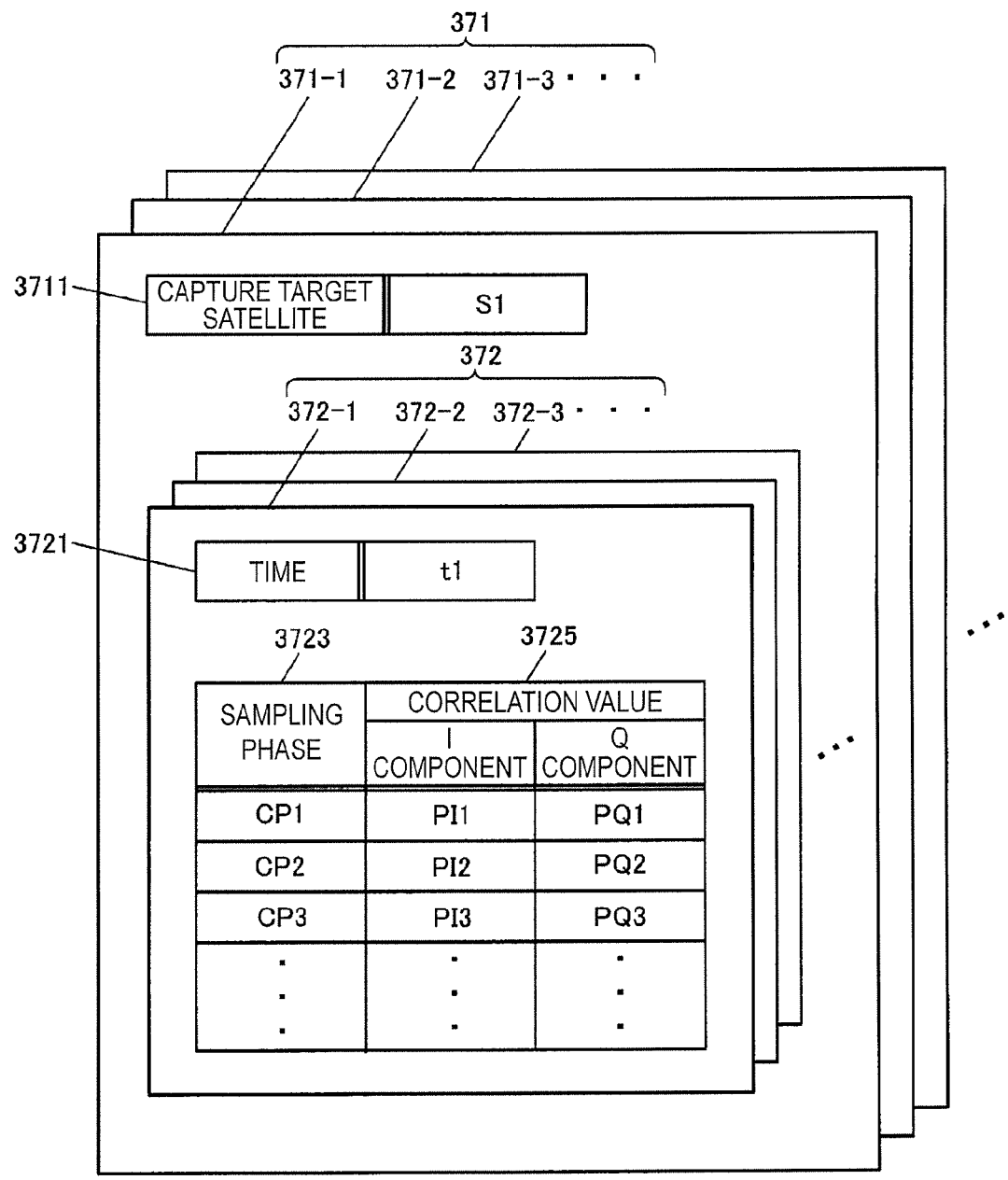
FIG. 17 is a view showing an exemplary data configuration of correlation value history data by capture target satellite.

FIG. 17 shows an exemplary data configuration of the correlation value history data by capture target satellite 371 (371-1, 371-2, 371-3 and so on). In the correlation value history data by capture target satellite 371, capture target satellite number 3711, and correlation value history data 372 (372-1, 372-2, 372-3 and soon), which is data about correlation value history, are associated with each other and stored with respect to each capture target satellite.

In the correlation value history data 372, a sampling phase 3723 and a correlation value 3725 for each of the I component and Q component are associated with each other and stored with respect to each time point 3721 when correlation operation is carried out by the correlation operation unit 33.

For example, the correlation value history data by capture target satellite 371-1 is data about a capture target satellite "S1". The I component of a correlation value in a sampling phase "CP1" obtained by correlation operation at a time point "t1" is "PI1" and its Q component is "PQ1". The correlation value history data by capture target satellite 371 is updated every time the CPU 35 takes in a correlation value from the correlation operation unit 33.

The captured satellite data 373 is data in which the number of a satellite that has its GPS satellite signal captured successfully (hereinafter referred to as "captured satellite") is stored. This data is updated by the CPU 35 through baseband processing.

The positioning data 375 is data in which the measured position found by positioning operation is stored. This data is updated by the CPU 35 through baseband processing.

The host CPU 40 is a processor that controls each part of the portable telephone unit 1 as a whole in accordance with various programs including a system program stored in the ROM 90. The host CPU 40 causes the display unit 60 to display a navigation screen on which the measured position inputted from the CPU 35 is plotted.

The operating unit 50 is an input device including, for example, a touch panel and button switches. The operating unit 50 outputs signals from pressed keys and buttons to the CPU 40. By this operation of the operating unit 50, various instructions such as a call request and an email transmission/reception request are inputted.

The display unit 60 includes an LCD (Liquid Crystal Display) or the like. The display unit 60 is a display device that shows various displays based on display signals inputted from the host CPU 40. A navigation screen, time information or the like is displayed on the display unit 60.

The portable telephone antenna 70 is an antenna that transmits and receives portable telephone wireless signals to and from a wireless base station installed by a communication service provider of the portable telephone unit 1.

The portable telephone wireless communication circuit unit 80 is a communication circuit unit of the portable telephone including an RF converter circuit, a baseband processing circuit and so on. By modulating and demodulating portable telephone wireless signals, the portable telephone wireless communication circuit unit 80 realizes transmission and reception of calls and emails.

The ROM 90 stores the system program for the host CPU 40 to control the portable telephone unit 1, and various programs and data to realize the navigation functions.

The RAM 100 forms a work area that temporarily stores the system program executed by the host CPU 40, various processing programs, data that are being processed in various kinds of processing, the results of processing and so on.

Figure 18:
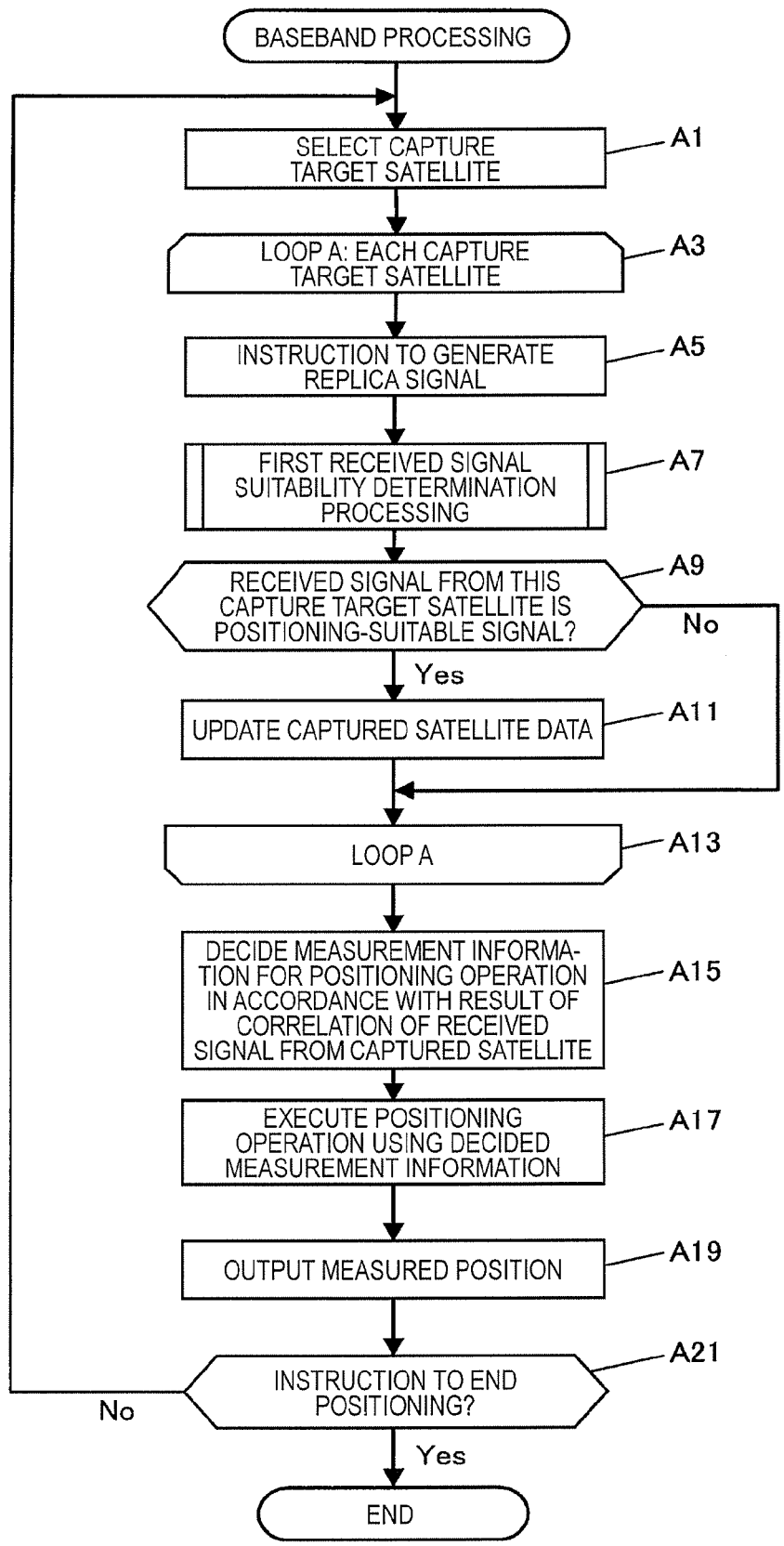
FIG. 18 is a flowchart showing a flow of baseband processing.

FIG. 18 is a flowchart showing a flow of baseband processing executed in the portable telephone unit 1 as the baseband processing program 361 stored in the ROM 36 is read out and executed by the CPU 35.

The baseband processing starts to be executed when it is detected by the CPU 35 that a positioning start instruction is given to the operating unit 50, together with the reception of a GPS satellite signal by the RF receiving circuit unit 20. The baseband processing is carried out parallel to various kinds of processing such as execution of various applications. Turning on and off the power of the portable telephone unit 1 may be interlocked with the start and stop of the GPS, and execution of processing may be started when power turn-on operation of the portable telephone unit 1 is detected.

Although not particularly explained, while the following baseband processing is being executed, it is assumed that reception of RF signals by the GPS antenna 10, down-conversion to IF signals by the RF receiving circuit unit 20 and calculation of correlation values by the correlation operation unit 33 are carried out at any time.

First, the CPU 35 selects a capture target satellite in accordance with orbit information of GPS satellites such as Almanac (step A1). Then, the CPU 35 executes processing of a loop A for the selected capture target satellite (steps A3 to A13). In the loop A, the CPU 35 gives the replica signal generating unit 34 an instruction to generate a replica signal corresponding to this capture target satellite (step A5). Then, the CPU 35 reads out and executes the first received signal suitability determination program 3611 stored in the ROM 36 and thus carries out first received signal suitability determination processing (step A7).

Figure 19:
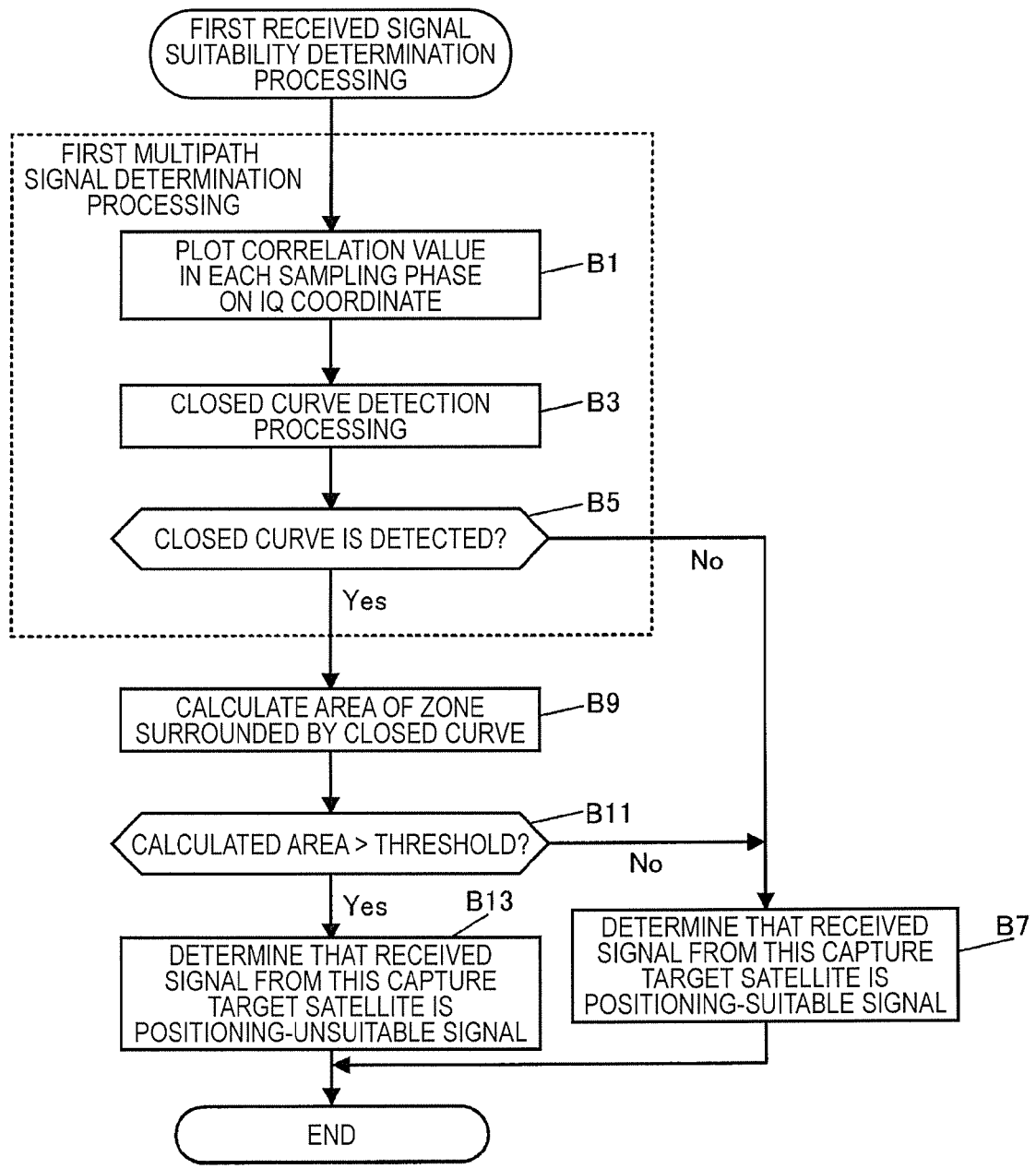
FIG. 19 is a flowchart showing a flow of first received signal suitability determination processing.

FIG. 19 is a flowchart showing a flow of first received signal suitability determination processing.

First, the CPU 35 carries out processing of steps B1 to B5 as first multipath signal determination processing. Specifically, referring to the correlation value history data by capture target satellite 371 in the RAM 37, the CPU 35 plots on the IQ coordinate the IQ components of the correlation value in each sampling phase stored with respect to this capture target satellite (step B1).

Next, the CPU 35 carries out closed curve detection processing to detect a closed curve formed by the correlation values plotted on the IQ coordinate (step B3). Specifically, the plot positions of the correlation values in the respective sampling phases are sequentially connected, and the plot positions of the correlation values corresponding to the most leading phase and the most lagging phase of these sampling phases are connected. As the resulting shape is analyzed by predetermined image processing, it is determined whether a closed curve is formed or not. Known technique can be employed for this image processing. For example, matching with predetermined closed curves of various shapes may be carried out to determine whether a closed curve is formed or not, or the inner area of the formed shape may be calculated to determine whether a closed curve is formed or not.

The closed curve need not be a perfectly closed curve in a strict sense (for example, a single closed curve) and may have any closed-curve shape. Therefore, it is possible to determine whether the array of plot positions is linear or not, and to determine that a closed curve is formed when the array is not linear.

If a closed curve is not detected (No in step B5), the CPU 35 determines that the received signal from the capture target satellite is not a multipath signal but a positioning-suitable signal (step B7) and then ends the first received signal suitability determination processing. On the other hand, if a closed curve is detected (Yes in step B5), the CPU 35 determines that the received signal from the capture target satellite is a multipath signal, and calculates the area in the zone surrounded by the detected closed curve (step B9).

Next, the CPU 35 determines whether the area calculated in step B9 exceeds a predetermined threshold value or not (step B11). If it is determined that the area is equal to or less than the threshold value (No in step B11), processing shifts to step B7. On the other hand, if it is detected that the area exceeds the threshold value (Yes in step B11), it is then determined that the received signal from the capture target satellite is a positioning-unsuitable signal (step B13) and ends the first received signal suitability determination processing.

Back to the baseband processing in FIG. 18, after carrying out the first received signal suitability determination processing, if it is determined that the received signal from the capture target satellite is not a positioning-suitable signal, that is, it is a positioning-unsuitable signal (No in step A9), the CPU 35 shifts processing to the next capture target satellite. On the other hand, if it is determined that the received signal is a positioning-suitable signal (Yes in step A9), the CPU 35 adds the capture target satellite to a captured satellite, then updates the captured satellite data 373 in the RAM 37 (step A11), and shifts processing to the next capture target satellite.

After carrying out the processing of steps A5 to A11 for all the capture target satellites, the CPU 35 ends the loop A. After that, the CPU 35 decides measurement information for positioning operation in accordance with the result of correlation of the received signal from each captured satellite stored in the captured satellite data 373 (step A15). Specifically, the receiving frequency and the sampling phase in which the correlation value reaches its peak correlation value are specified and used as measurement information for this captured satellite.

Next, by using the measurement information decided in step A15, the CPU 35 executes positioning operation, for example, using a least square method or a Kalman filter and thus measures the current position of the portable telephone unit 1 (step A17) The CPU 35 stores this measured position in the positioning data 375 in the RAM 37. Then, the CPU 35 outputs the measured position to the host CPU 40 (step A19).

After that, the CPU 35 determines whether a positioning end instruction is given to the operating unit 50 by the user (step A21). If it is determined that such an instruction is not given (No in step A21), the CPU 35 returns to step A1. If it is determined that a positioning end instruction is given (Yes in step A21), the CPU 35 ends the baseband processing.

According to this embodiment, it is possible to determine whether a received signal is a multipath signal or not, by a simple method such as sequentially plotting on the IQ coordinate the correlation value in each sampling phase obtained by correlation operation and then detecting whether the plotted positions are arrayed in a closed-curve shape or not, or whether the plotted positions are not linearly arrayed. Moreover, it is possible to determine whether the received signal is usable for positioning or not, in accordance with the extent of the arrayed closed curve. Instead of carrying out processing of steps B9 and B11, it can be determined that the received signal cannot be used for positioning when the received signal is determined as a multipath signal.

2-2. Second Embodiment

In a second embodiment, a second received signal suitability determination program is stored in the ROM 36, instead of the first received signal suitability determination program 3611 of the first embodiment. The CPU 35 reads out and executes the second received signal suitability determination program in step A7 of the baseband processing shown in FIG. 18, thereby carrying out second received signal suitability determination processing.

Figure 20:
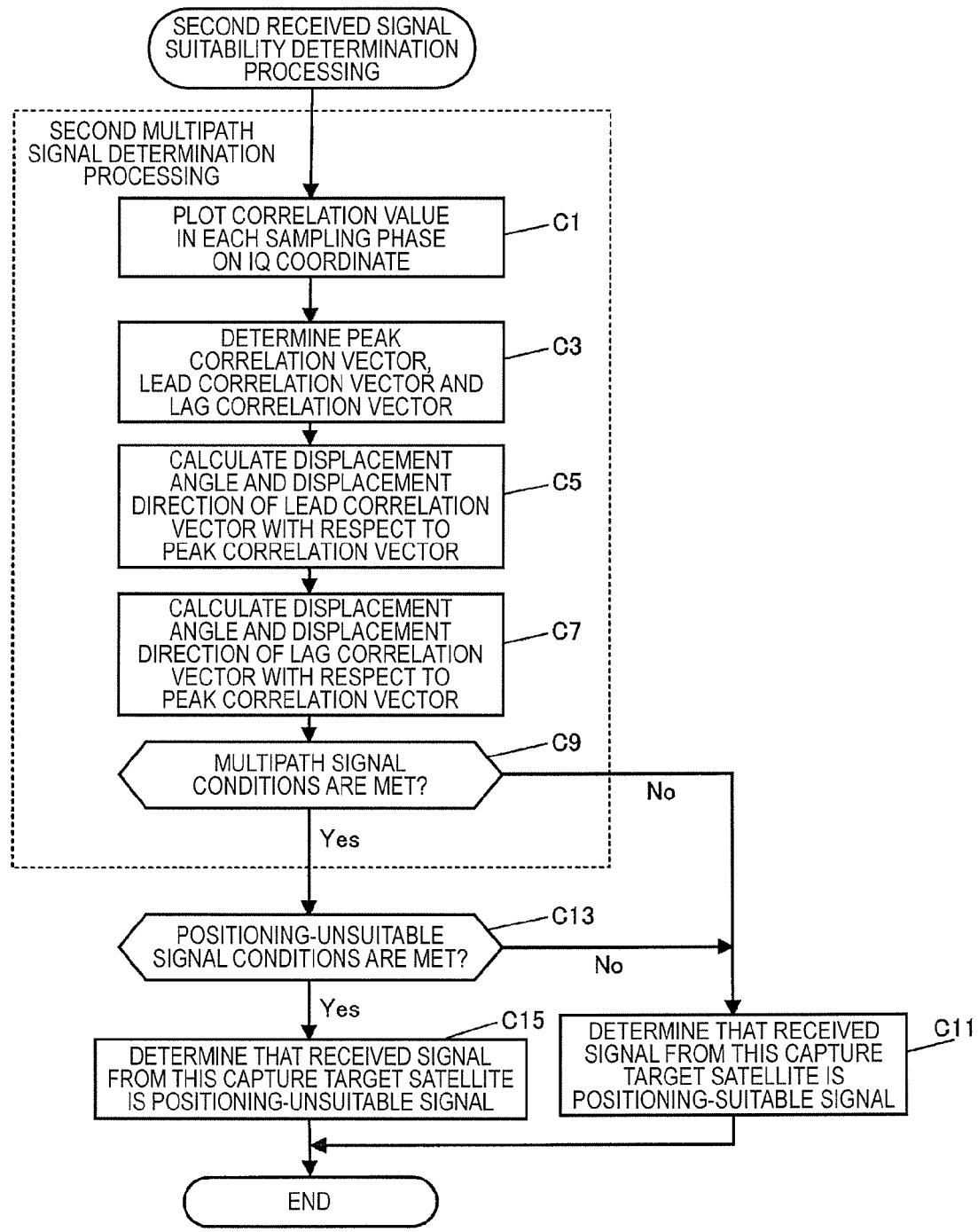
FIG. 20 is a flowchart showing a flow of second received signal suitability determination processing.

FIG. 20 is a flowchart showing a flow of second received signal suitability determination processing.

The CPU 35 carries out processing of steps C1 to C9 as second multipath signal determination processing. First, referring to the correlation value history data by capture target satellite 371 in RAM 37, the CPU 35 plots on the IQ coordinate the IQ components of the correlation value in each sampling phase stored with respect to the capture target satellite (step C1).

Next, the CPU 35 determines a peak correlation vector, a lead correlation vector and a lag correlation vector in accordance with the correlation values plotted on the IQ coordinate (step C3). Specifically, on the IQ coordinate, it is determined that the positional vector from the origin toward the plot position of the peak correlation value is the peak correlation vector, the positional vector from the origin toward the plot position of the lead correlation value is the lead correlation vector, and the positional vector from the origin toward the plot position of the lag correlation value is the lag correlation vector.

After that, the CPU 35 calculates the displacement angle "θ1" and displacement direction of the lead correlation vector with respect to the peak correlation vector (step C5). The CPU 35 also calculates the displacement angle "θ2" and displacement direction of the lag correlation vector with respect to the peak correlation vector (step C7).

Then, the CPU 35 determines whether multipath signal conditions are met or not, in accordance with the result of the calculations in steps C5 and C7 (step C9). Specifically, if the displacement direction of the lead correlation vector and the displacement direction of the lag correlation vector are opposite to each other and the sum of the absolute values of the displacement angle "θ1" of the lead correlation vector and the displacement angle "θ2" of the lag correlation vector is equal to or greater than a first threshold angle (for example, 15 degrees), it is determined that multipath signal conditions are met.

It is also possible to determine that multipath signal conditions are met if one or both of condition (1) that the absolute value of the displacement angle "θ1" of the lead correlation vector is equal to or greater than a predetermined angle (for example, 7.5 degrees) and condition (2) that the absolute value of the displacement angle "θ2" of the lag correlation vector is equal to or greater than a predetermined angle (for example, 7.5 degrees) are met, instead of determining in accordance with the sum of the absolute values of the displacement angle "θ1" of the lead correlation vector and the displacement angle "θ2" of the lag correlation vector.

If it is determined in step C9 that multipath signal conditions are not met (No in step C9), the CPU 35 determines that the received signal from the capture target satellite is not a multipath signal but a positioning-suitable signal (step C11), and ends the second received signal suitability determination processing.

Meanwhile, if it is determined in step C9 that multipath signal conditions are met (Yes in step C9), the CPU 35 determines that the received signal is a multipath signal, and then determines whether positioning-unsuitable signal conditions are met or not (step C13). Specifically, if the sum of the absolute values of the displacement angle "θ1" of the lead correlation vector and the displacement angle "θ2" of the lag correlation vector is equal to or greater than a second threshold angle (for example, 30 degrees) defined as a greater angle than the first threshold angle, it is determined that positioning-unsuitable signal conditions are met.

As in the determination of the multipath signal conditions, it is also possible to determine that positioning-unsuitable signal conditions are met if one or both of condition (1) that the absolute value of the displacement angle "θ1" of the lead correlation vector is equal to or greater than a predetermined angle (for example, 15 degrees) and condition (2) that the absolute value of the displacement angle "θ2" of the lag correlation vector is equal to or greater than a predetermined angle (for example, 15 degrees) are met.

If it is determined that positioning-unsuitable signal conditions are not met (No in step C13), the CPU 35 shifts processing to step C11. Meanwhile, if it is determined that positioning-unsuitable signal conditions are met (Yes in step C13), the CPU 35 determines that the received signal from the captured satellite is a positioning-unsuitable signal (step C15), and ends the second received signal suitability determination processing.

According to this embodiment, it is possible to determine whether a received signal is a multipath signal or not, in accordance with the mutual positional relation between a peak correlation value, and correlation values in a lead phase and a lag phase that are away from the phase of the peak correlation value by the same distance in leading and lagging directions, respectively, when these correlation values are plotted on the IQ coordinate. It is also possible to determine whether the received signal is usable for positioning or not, in accordance with the angle formed by positional vectors. Instead of processing of step C13, it can be determined that the received signal cannot be used for positioning if it is determined that the received signal is a multipath signal.

2-3. Third Embodiment

In a third embodiment, a third received signal suitability determination program is stored in the ROM 36, instead of the first received signal suitability determination program 3611 of the first embodiment. The CPU 35 reads out and executes the third received signal suitability determination program, thereby carrying out third received signal suitability determination processing in step A7 of the baseband processing shown in FIG. 18.

Figure 21:
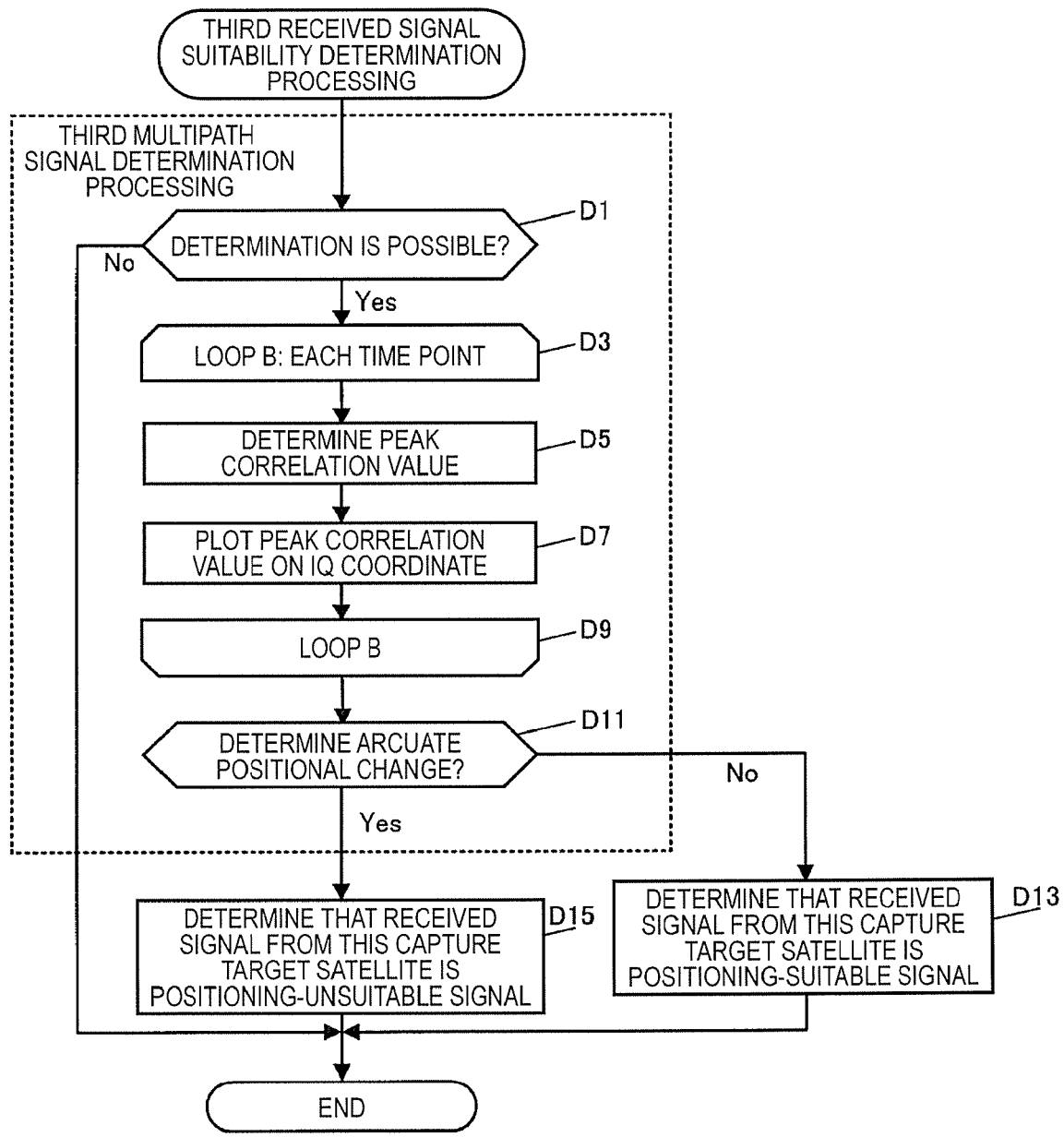
FIG. 21 is a flowchart showing a flow of third received signal suitability determination processing.

FIG. 21 is a flowchart showing a flow of third received signal suitability determination processing.

The CPU 35 carries out processing of steps D1 to D11 as third multipath signal determination processing. First, the CPU 35 determines whether it is possible to determine suitability of a received signal or not (step D1). Specifically, referring to the correlation value history data 372 about the capture target satellite stored in the correlation value history data by capture target satellite 371 in the RAM 37, the CPU 35 determines that it is possible to determine suitability of the received signal if the correlation value is provided for a sufficient period of time (for example, 60 seconds).

If it is determined that it is impossible to determine suitability of the received signal (No in step D1), the CPU 35 ends the third received signal suitability determination processing. If it is determined that it is possible to determine suitability of the received signal (Yes in step D1), the CPU 35 executes processing of a loop B with respect to each time point 3721 stored in the correlation value history data 372 for the capture target satellite (steps D3 to D9).

In the loop B, the CPU 35 determines a peak correlation value in accordance with the correlation values 3725 stored in the correlation value history data 372 (step D5). Specifically, for each sampling phase 3723, the square root of the sum of the squares of I and Q components of the correlation value $(=(I^2+Q^2)^{1/2})$ is calculated, and the correlation value 3725 corresponding to the sampling phase 3723 which has the largest calculated value is determined as the peak correlation value. Then, the CPU 35 plots the determined peak correlation value on the IQ coordinate (step D7) and shifts processing to the next time point 3721.

After carrying out processing of steps D5 and D7 at all the time points 3721, the CPU 35 ends the loop B. Next, the CPU 35 determines whether the plot positions of the peak correlation values plotted on the IQ coordinate with respect to all the time points 3721 have an arcuate positional change (i.e., arrayed in an arcuate shape) or not (step S11). The determination of whether the plotted positions have an arcuate positional change or not can be realized by a known technique based on predetermined shape recognition processing and therefore will not be described further in detail.

If it is determined that there is no arcuate positional change (No in step D11), the CPU 35 determines that the received signal from the capture target satellite is not a multipath signal but a positioning-suitable signal (step D13), and ends the third received signal suitability determination processing. If it is determined that there is an arcuate positional change (Yes in step D11), the CPU 35 determines that the received signal from the capture target satellite is a multipath signal and a positioning-unsuitable signal (step D15), and ends the third received signal suitability determination processing.

According to this embodiment, by a simple technique such as verifying time-series change of the peak correlation value on the basis of the results of correlation operation processing carried out plural times instead of one-time correlation operation processing, and thus determining whether the peak correlation value has an arcuate positional change or not, it is possible to determine whether the received signal is a multipath signal or not, and hence to determine whether the received signal is usable for positioning operation or not.

3. OTHER EMBODIMENTS

3-1. Electronic Apparatus

The invention can be applied to any electronic apparatus that has a positioning device. For example, the invention can similarly be applied to a laptop computer, a PDA (Personal Digital Assistant), a car navigation system and so on.

3-2. Satellite Positioning System

In the above embodiments, the GPS is employed as an exemplary satellite positioning system. However, other satellite positioning systems may also be used such as WAAS (Wide Area Augmentation System), QZSS (Quasi Zenith Satellite System), GLONASS (GLObal NAvigation Satellite System), and GALILEO.

3-3. Differentiation of Processing

A part of all of the processing executed by the CPU 35 may be executed by the host CPU 40. For example, the host CPU 40 may carry out received signal suitability determination processing and the CPU 35 may carry out positioning operation based on the result of the determination. Alternatively, the host CPU 40 may execute all the processing that is to be carried out by the CPU 35, including positioning operation.

3-4. Decision of Measurement Information

In the third embodiment, if it is determined that the peak correlation value has an arcuate positional change on the IQ coordinate, the direct wave component of the result of correlation may be extracted from the arcuate positional change, and measurement information can be acquired and decided from the direct wave component of the result of correlation.

Figure 22:
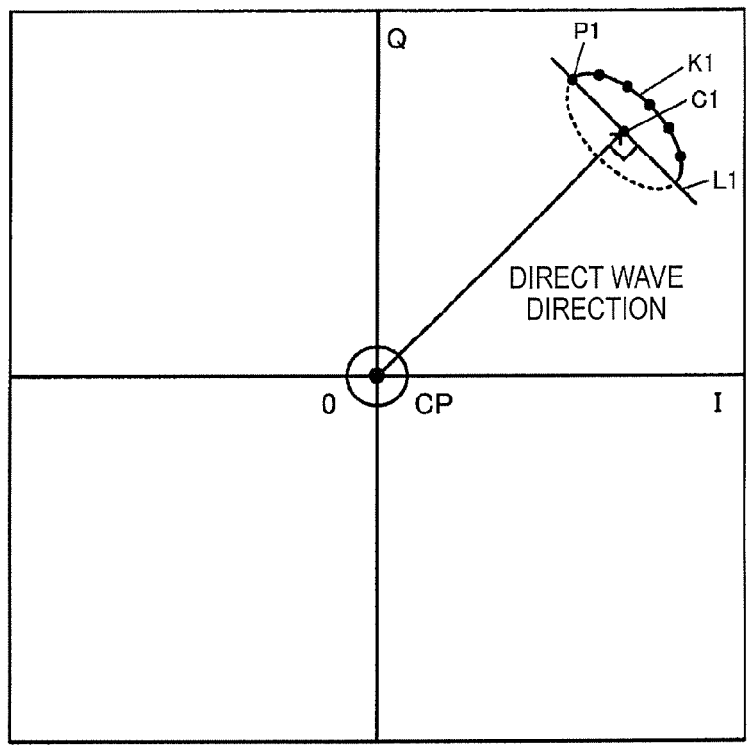
FIG. 22 is an explanatory view of the principle of measurement information decision.
Figure 23:
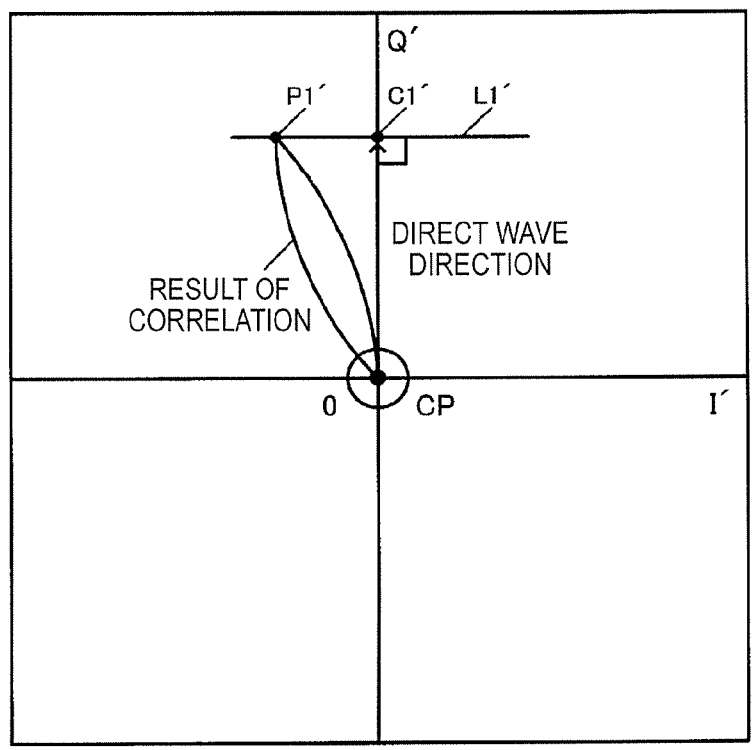
FIG. 23 is an explanatory view of the principle of measurement information decision.
Figure 24:
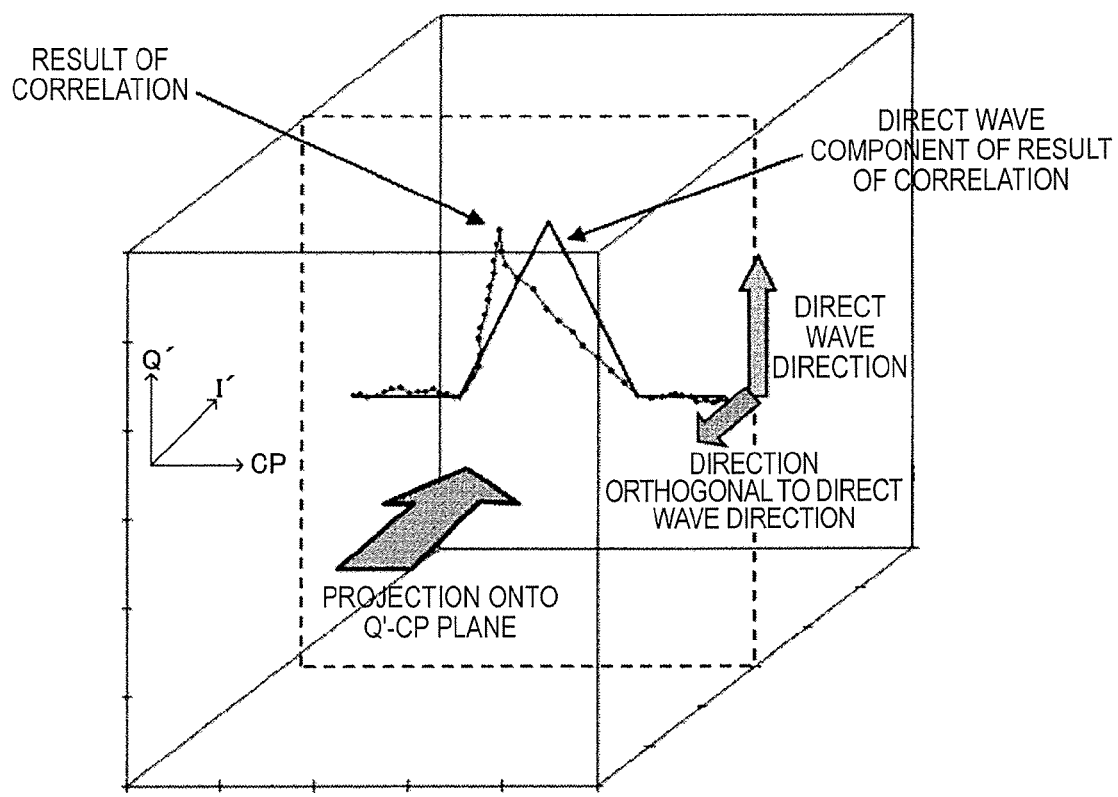
FIG. 24 is an explanatory view of the principle of measurement information decision.

This will be described specifically with reference to the drawings. FIG. 22 to FIG. 24 are views for explaining the principle of decision of measurement information in this case. As shown in FIG. 22, it is now detected that the peak correlation value forms an arcuate locus "K1" on the IQ coordinate. In this case, the direction from the origin "O" on the IQ coordinate toward the center "C1" of a circle specified by the arcuate component is considered to be the direct wave direction. Then, a plot position "P1" of the peak correlation value closest to a line "L1" that passes through the center "C1" of the circle and that is orthogonal to the direct wave direction is selected.

Next, an I'Q' coordinate system having the found direct wave direction as its Q' axis is constructed, and the IQ coordinate system is converted to the I'Q' coordinate system. This coordinate conversion can be realized by known matrix operation. Consequently, in the I'Q' coordinate system, the plot position is converted so that the peak correlation value equivalent to the peak correlation value "P1" in the IQ coordinate system is represented by "P1'" in the I'Q' coordinate system, as shown in FIG. 23. Also, of the correlation value history data 372, each of the correlation values from the results of correlation at the time points 3721 at which the peak correlation value "P1" is stored is converted and plotted in the I'Q' coordinate system.

Moreover, this is then considered in terms of three-dimensional axes including the CP axis (axis in the phase direction). As shown in FIG. 24, the plot positions on the I'-Q'-CP coordinate are projected on the Q'-CP plane (as viewed from the direction of I' axis). Thus, since the indirect wave component of the received signal is in the direction of I' axis, the indirect wave component is eliminated and the direct wave component of the result of correlation can be extracted alone. That is, measurement information can be acquired and decided from the extracted direct wave component of the result of correlation.

In this case, a measurement information decision program is stored in advance in the ROM 36 of the portable telephone unit 1 as a subroutine of the baseband processing program 361. The CPU 35 reads out and executes the measurement information decision program in baseband processing and thus carries out measurement information decision processing. The CPU 35 then carries out positioning operation using the decided measurement information, thereby measuring the current position.

Figure 25:
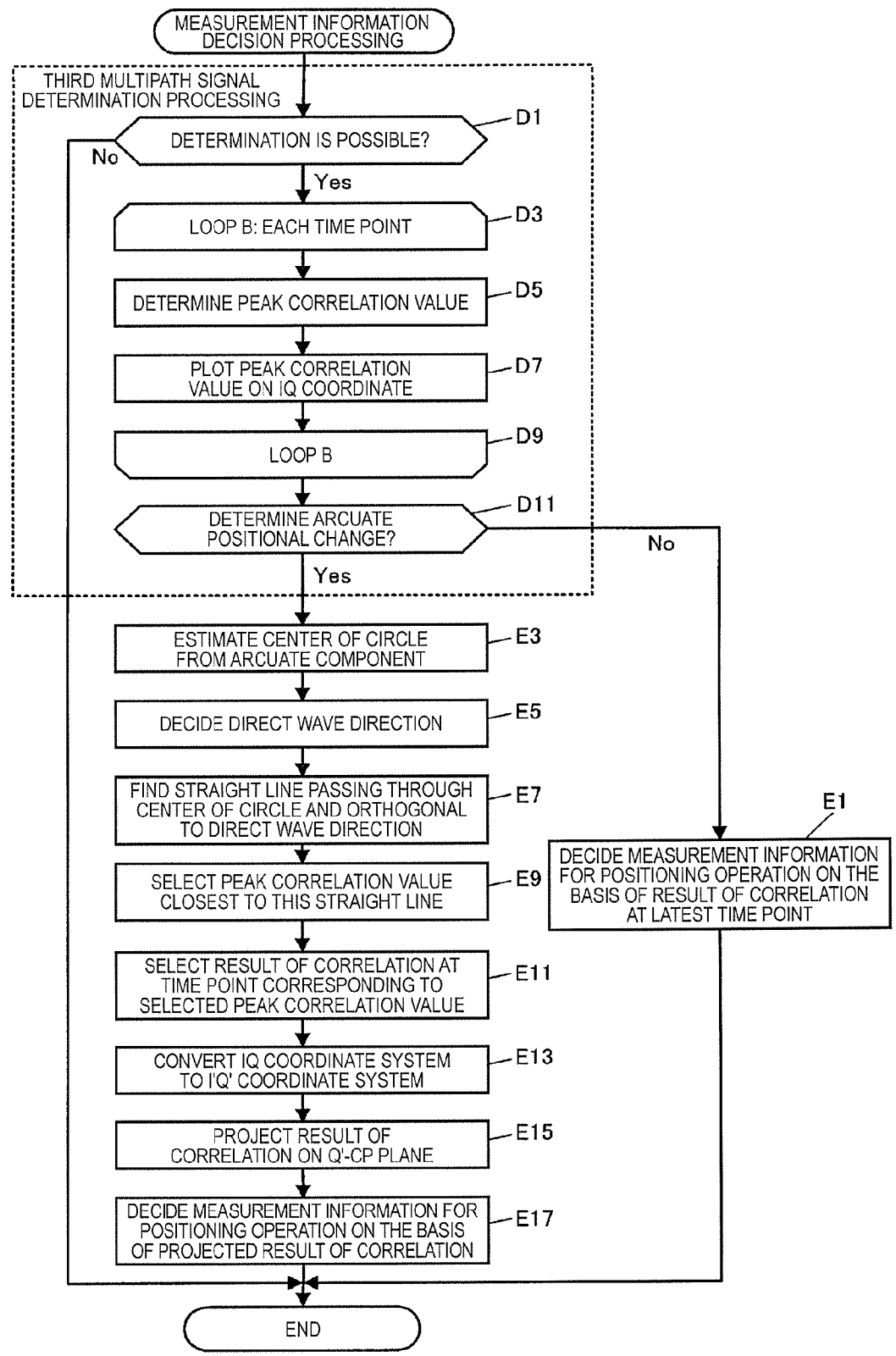
FIG. 25 is a flowchart showing a flow of measurement information decision processing.

FIG. 25 is a flowchart showing a flow of measurement information decision processing. The same steps as in the third received signal suitability determination processing shown in FIG. 21 are denoted by the same reference numerals, and different parts from the third received signal suitability determination processing will be mainly described.

First, the CPU 35 carries out third multipath signal determination processing (steps D1 to D11). If it is determined in step D11 that the peak correlation value has no arcuate positional change (No in step D11), the CPU 35 determines that the received signal from the capture target satellite is not a multipath signal.

Then, the CPU 35 decides measurement information for positioning operation from the result of correlation at the latest time point 3721, of the correlation value history data 372 with respect to the capture target satellite stored in the correlation value history data by capture target satellite 371 in the RAM 37 (step E1), and ends the measurement information decision processing. Measurement information for positioning operation may be decided from the result of correlation at an arbitrary time point, instead of deciding measurement information for positioning operation from the result of correlation at the latest time point.

If it is determined in step D11 that the peak correlation value has an arcuate positional change (Yes in step D11), the CPU 35 determines that the received signal from the capture target satellite is a multipath signal, and then estimates the center of a circle from the arcuate component (step E3) This estimation can be realized by known geometric operation. Then, the direction from the origin on the IQ coordinate to the center of the circle is decided as the direct wave direction (step E5).

After that, the CPU 35 finds a straight line that passes through the center of the circle and that is orthogonal to the direct wave direction decided in step E5 (step E7), and selects the peak correlation value that is closest to the straight line (step E9). The CPU 35 then selects the result of correlation at the time point 3721 corresponding to the peak correlation value selected in step E9, from the correlation value history data 372 with respect to the capture target satellite stored in the correlation value history data by capture target satellite 371 (step E11).

After that, the CPU 35 converts the IQ coordinate system to the I'Q' coordinate system (step E13). Specifically, a coordinate system having the direct wave direction decided in step E5 as its Q'-axis direction is found and a conversion formula for the coordinate system is constructed. Then, each of the correlation values of the result of correlation selected in step E11 is converted to positional coordinates in the I'-Q'-CP coordinate system. The converted plot positions are projected on the Q'-CP plane (step E15). Measurement information for positioning operation is decided from the projected plot positions (step E17). Then, measurement information decision processing ends.

With the above method, even if it is determined that a received signal is a multipath signal, the direct wave component of the result of correlation can be extracted alone by a simple technique such as coordinate conversion and projection of the result of correlation. As positioning operation is carried out by using measurement information acquired and decided from the extracted direct wave component, positioning accuracy can be improved even if the portable telephone unit 1 is located in a multipath environment.

What is claimed is:

1. A multipath signal determination method comprising:
    carrying out a correlation operation between a received signal of a positioning signal spread-modulated with a spread code and a replica signal of the spread code with respect to each of IQ components at a predetermined sampling phase interval;
    determining whether the received signal is a multipath signal or not, in accordance with a plot position when each correlation value in each of the sampling phases is sequentially plotted on an IQ coordinate, wherein the determining whether the received signal is the multipath signal or not includes determining that the received signal is the multipath signal when the plot position sequentially plotted on the IQ coordinate has a shape of a closed curve; and
    determining suitability of the received signal for use in positioning operation in accordance with an extent of the closed curve.

2. A multipath signal determination method comprising:
    carrying out a correlation operation processing plural times with the lapse of time, in which the correlation operation is carried out between a received signal of a positioning signal spread-modulated with a spread code and a replica signal of the spread code with respect to each of IQ components at a predetermined sampling phase interval;
    carrying out selection of a peak correlation value from correlation values in each of the sampling phases for each of the plural times of the correlation operation processing; and
    determining whether the received signal is a multipath signal or not, in accordance with a positional change in the peak correlation value on an IQ coordinate with the lapse of time, wherein the determining of whether the received signal is the multipath signal or not includes determining that the received signal is the multipath signal when the change in position of the peak correlation value on the IQ coordinate with the lapse of time is an arcuate change in position.

3. A signal suitability determination method comprising, when it is determined by the multipath signal determination method according to claim 1 that the received signal is a multipath signal, determining that the received signal is unsuitable for use in positioning operation.

4. A positioning operation method comprising carrying out positioning operation based on a remaining positioning signal after excluding a positioning signal that is determined as unsuitable by the signal suitability determination method according to claim 1, of plural received positioning signals.

5. A non-transitory computer readable medium storing a program for causing a computer built in a positioning device to execute the positioning operation method according to claim 4.

6. A multipath signal determination circuit having a processor that executes:
    correlation operation between a received signal of a positioning signal spread-modulated with a spread code and a replica signal of the spread code with respect to each of IQ components at a predetermined sampling phase interval; and
    determination of whether the received signal is a multipath signal or not, in accordance with a plot position when each correlation value in each of the sampling phases is sequentially plotted on an IQ coordinate, wherein the determination whether the received signal is the multipath signal or not includes determination of a fact that the received signal is the multipath signal when the plot position sequentially plotted on the IQ coordinate has a shape of a closed curve; and
    determination of suitability of the received signal for use in positioning operation in accordance with an extent of the closed curve.

* * * * *